United States Patent [19]
Nakamura et al.

[11] Patent Number: 5,633,042
[45] Date of Patent: May 27, 1997

[54] PROCESS FOR MANUFACTURING PREPREGS FOR USE AS ELECTRIC INSULATING MATERIAL

[75] Inventors: Yoshihiko Nakamura, Nishinomiya; Masahiro Matsumura, Katano; Yasuo Fukuhara, Osaka; Yukio Hatta, Minoo; Masaharu Yamamoto, Nagoya; Makizi Miyao, Kawagoe; Kiyohiro Nagao, Hiki-gun; Takayuki Fukuda, Kawachi-gun; Hiroshi Toshima, Iruma-gun; Shigekazu Takanohashi, Kawagoe; Akihiro Atsumi, Yokohama, all of Japan

[73] Assignee: Matsushita Electric Works, Ltd., Osaka, Japan

[21] Appl. No.: 654,168

[22] Filed: May 28, 1996

[51] Int. Cl.$^6$ .................................................. B05D 3/02
[52] U.S. Cl. ....................... 427/386; 427/58; 427/289; 427/294
[58] Field of Search ................... 427/386, 58, 289, 427/294

[56] References Cited

FOREIGN PATENT DOCUMENTS 5-320382  12/1993  Japan.

*Primary Examiner*—Bernard Pianalto
*Attorney, Agent, or Firm*—Burns, Doane, Swecker & Mathis, L.L.P.

[57] ABSTRACT

In a process for manufacturing a prepreg for use as an electrically insulating material, a main epoxy resin composition and a subsidiary resin composition containing a hardener which have been separately filtered and metered are quickly mixed into a mixture resin composition, a reinforcing member is coated with a uniformly thin film of the mixture resin composition by a die coater under specific temperature, average residence time and low shear conditions, the coated reinforcing member is heated in non-contact manner by an infrared ray heater to have the member impregnated with the resin composition of the film, the member is further heated in non-contact manner by a floating dryer to have the resin composition semi-hardened, and the member is unified through compaction rolls, whereby the prepreg in the form of a sheet-shaped fiber reinforced composite material is continuously manufactured.

14 Claims, 12 Drawing Sheets

PROCESS FOR MANUFACTURING PREPREGS FOR USE AS ELECTRIC INSULATING MATERIAL

BACKGROUND OF THE INVENTION

This invention relates to a process for manufacturing a composite material comprising a sheet-shaped reinforcing substrate made of fibers and impregnated with a matrix resin consisting of a thermosetting resin, in particular, a prepreg for use as electric insulating material comprising such fiber reinforced composite material as prepregs by impregnating such sheet-shaped fibrous reinforcing substrate as a glass cloth with a thermosetting resin without using any solvent.

DESCRIPTION OF RELATED ART

As the process for manufacturing such fiber reinforced composite material as the prepreg for use as electric insulating material, in general, there have been known hot-melting, solvent-using and the like processes which will be described in the followings.

In the hot-melting process, a so-called two staged process is performed by once coating a coated paper excellent in release properties with a solventless resin, and laminating it on the sheet-shaped fibrous reinforcing substrate. In this case, there have been such problems that the process is costly due to a low productivity, and the sheet-shaped fibrous reinforcing substrate of a heavy woven mesh is poor in the resin impregnation properties. In the solvent-using process, as has been described in Japanese Patent Laid-Open Publication No. 5-320382, for example, there are taken the steps of reducing the viscosity of a resin employed with a solvent, dipping a glass cloth in a bath of this resin to have the cloth impregnated with the resin by means of the capillarity, and thereafter drying and semi-hardening this resin-impregnated glass cloth, as in the case of manufacturing a glass cloth epoxy prepreg to be used in making printed-wiring substrate for use as the electric insulating material. More concretely, there has been provided the process comprising the steps of impregnating a continuous glass cloth with a thermosetting resin within a bath of the resin, drying them in a drying furnace to have them semi-hardened to be the prepreg, uniformly pressurizing them through a press roll to have any surface projection crushed, applying to them after the crushing a radiation heating by means of a far infrared ray furnace to smooth crushed portion and any cracked and whitened portions therearound, and immediately thereafter flattening the surfaces through a cooling roll to obtain the prepreg.

Since in the foregoing solvent-using process the solvent which is combustible is employed, however, there have been such problems that there are required facilities for solvent recovery, explosion prevention and the like so as to render required installation costs to be high, there remain trace amounts of residual solvent in the prepreg so as to deteriorate the quality with bubbles occurred thereby, and so on.

In order to remove the foregoing problems, on the other hand, a manufacturing process has been suggested in Japanese Patent Laid-Open Publication No. 5-200748. In a device for working this manufacturing process, a double belt press is provided, and a feeding unit and an extruder are disposed in front of an inlet of this double belt press. The feeding unit includes a storage roll for glass fiber woven cloth not impregnated with any resin and a succeeding storage roll. Behind the double belt press, a reefer unit including a roll for a web of the prepreg and a take-over roll is provided.

In the above described steps, the glass fiber woven cloth not impregnated with any resin is sequentially fed out of the storage roll and is supplied through a turning roll to the double belt press. The succeeding storage roll further provided in the feeding unit feeds the glass fiber woven cloth, as the glass fiber woven cloth of the other storage roll terminates. In the extruder, epoxy resin is fused, and the thus fused resin is extruded through a slit nozzle of expanded width so as to coat the glass fiber woven cloth at a position adjacent to the turning roller, in the form of a film.

A laminar member thus formed with the glass fiber woven cloth and the film of epoxy resin is then led into the double belt press and is heated under a planar pressure, upon which the fused epoxy resin penetrates into a web of the glass fiber woven cloth and is further hardened to the B-stage. At an outlet of the double belt press, the web of the prepreg impregnated with epoxy resin semi-hardened to the B-stage is fed out of the double belt press as cooled to be without any adhesion, and is reeled on the roll of the feeler unit.

The foregoing extruder includes a narrow elongated cylinder, in which a screw driven by a motor through a reduction transmission unit is disposed. A rear side part of the screw is formed to be a spiral recess for receiving a flaky or powdery mixing member intended to be fused. This mixing member is charged in a hopper of the extruder. Epoxy resin is further conveyed through the screw and is fused during this conveyance. For this purpose, a plurality of heating sleeves and provided to externally surround the cylinder. As epoxy resin is conveyed through the cylinder, the resin is heated to be fused and is compressed, so that this epoxy resin will form a uniform and viscoelastic fused body at front end part of the screw. The fused body of epoxy resin flows out of the expanded slit nozzle flange-mounted to the front part of the cylinder, as a flat film having a substantially square cross section. Here, the glass fiber woven cloth is coated with the film at the position adjacent to the turning roller as has been described, and is led to the double belt press.

In the foregoing steps, however, there are such problems that a melt residence time of epoxy resin in the extruder is long enough to be likely to become hardened within the extruder, that epoxy resin becomes apt to generate heat due to a share of the resin high in the molten state, that the resin is poor in the film-forming properties, and so on.

In a Japanese Patent Publication No. 60-39288, further, there has been suggested a process for manufacturing the prepreg by heating and fusing, into epoxy resin, polyhydric phenol having phenolic hydroxyl group, a hardener, an etherification reaction catalyst with respect to epoxy group and phenolic hydroxyl group, and a hardening promotor, and hardening the resin up to the B-stage.

In this process, however, there are problems that the heated and fused resin is extremely high in the reactivity to be apt to cause the hardening reaction to occur in coating step of sheet-shaped fiber reinforcing substrate, so that the resin will be poor in the film forming ability and infiltrating properties and, eventually the resin unable to be stably and sequentially manufactured.

SUMMARY OF THE INVENTION

An object of the present invention is, therefore, to provide a process for manufacturing a composite material as a prepreg for use as electrically insulating material, the process being capable of continuously obtaining the complex material which is short in the melt residence time, eliminating hardening trouble of the resin in the extruder, preventing the heat generation due to the share in the molten state with such shear lowered, and rendering the resin impregnation to be uniform with the film-forming properties to be excellent further and with the quality made constant.

In the present invention, the above object can be established by means of a process for continuously manufacturing the prepreg for use as the electrically insulating material, consisting of a composite sheet material of a fibrous sheet-shaped reinforcing substrate impregnated with a thermosetting resin, the process comprising the steps of coating uniformly one surface of a fibrous sheet-shaped reinforcing substrate with the matrix thermosetting resin substantially containing no solvent and in molten state by means of a die coater, heating the fibrous sheet-shaped reinforcing substrate coated with the matrix thermosetting resin by means of non-contact type heating unit and semi-hardening the matrix resin, and either cutting the composite sheet-material of the sheet-shaped reinforcing substrate consisting of the semi-hardened matrix resin and fibers into pieces of a fixed length or reeling the composite sheet material without the cutting, the respective steps being made continuous.

Further, it is preferable that the process includes, after the step of coating the one surface of the sheet-shaped reinforcing substrate with the matrix thermosetting resin, a step of heating the sheet-shaped reinforcing substrate consisting of the matrix resin and fibers with a non-contact type infrared ray heater, to have the fibrous sheet-shaped reinforcing substrate with the matrix resin.

It is also desirable that a step of smoothing and unifying the matrix resin by pressing the sheet-shaped reinforcing substrate consisting of the matrix resin and fibers through a plurality of rolls is continuously executed at least between said coating step and said semi-hardening step, of during or after said semi-hardening step.

Further, as required, after the first coating step of uniformly coating over the one surface of the foregoing sheet-shaped reinforcing substrate, a second coating step of coating over the other surface opposite to the already coated surface with the same thermosetting matrix resin as the foregoing matrix resin is executed, after the first coating step and before the semi-hardening step of the matrix resin.

Further, it is preferable to arrange that am epoxy resin composition containing epoxy resin composition as a main component and a hardener is subjected to a filtration at the viscosities of 1,000 to 500,000 centipoises (cPS) of respective resins, respectively separately or after being mixed, while being led from discharge ports of components of respective reservoirs.

Further detailed arrangement and action of the present invention shall become clear as the description advances with reference to examples in the followings.

While the present invention shall now be described in the followings with reference to the specific Examples, it should be appreciated that the intention is not to limit the present invention only to these specific Examples but rather to include all alterations, modifications and equivalent arrangements possible within the scope of appended claims.

DETAILED DESCRIPTION OF THE PREFERRED EXAMPLES

Figure 1:
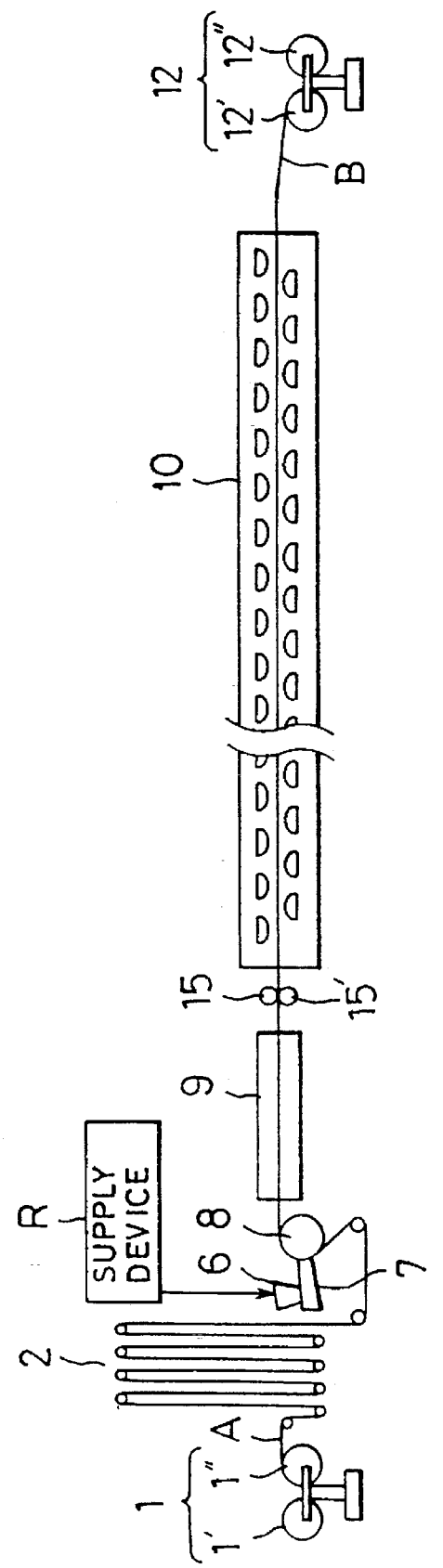
FIG. 1 is a schematic explanatory view of an apparatus for working the process for manufacturing a composite material as the prepreg for use as an electric insulating material according to the present invention.

Referring to FIG. 1, the description shall be made to the manufacturing apparatus for working the manufacturing process of the composite material as the prepreg for use as the electric insulating material according to the present invention. In the following description, it is assumed that a glass cloth substrate is impregnated with epoxy resin as a matrix resin, for sequentially manufacturing the prepreg.

In FIG. 1, the apparatus for manufacturing the prepreg is illustrated, which apparatus comprises an unwinder 1 for unwinding a glass cloth substrate A at left side end in the drawing, and a feeler 12 for reeling a prepreg B at right side end. The unwinder 1 comprises a roller 1' and a take-over roller 1", and the reeler 12 likewise comprises rollers 12' and 12". Adjacent to the unwinder 1, an accumulator 2 actuated upon change-over between the roller 1' and the take-over roller 1" for enabling a sequential operation is provided, and further next thereto a back-up roller 8 hard chrome plated is disposed.

On the other hand, the present apparatus comprises a matrix resin supply device R for fusing, mixing and metering a resin composition containing epoxy resin, a hardener, a hardening promotor and so on, and this matrix resin supply device R is connected through a hopper 6 to a coater 7 of a gear pump in die type. Further, a back-up roller 8 is disposed as opposed in proximity to a lip part of the coater 7. At the back-up roller 8, the glass cloth substrate A supplied from the accumulator 2 is coated on one surface with epoxy resin containing the hardener, that is, the matrix resin by means of the coater 7 at a uniform thickness.

While the back-up roller 8 should preferably be provided with a coating of fluoroplastic or silicone rubber, represented by polytetrafluoroethylene (PTFE), tetrafluoroethyleneperfluoroalkyl vinyl ether copolymer (PFA), hexafluoropropylene-tetrafluoroethylene copolymer (FEP) and the like, for improving the release properties with respect to the resin of metal roller surface, it is not required to be limited thereto. Further, the back-up roller 8 should preferably be made in a jacket type for controlling the temperature constant by circulating a predetermined liquid medium within the jacket, but it is not required to be limited thereto. Further adjacent to the back-up roller 8, there is provided an infrared ray heater 9 for impregnating the glass cloth substrate A with the matrix resin. This infrared ray heater 9 is a non-contact type heater in which an object to be heated is passed through an intermediate part between upper and lower heaters. In the present instance, the infrared ray heater 9 is preferably of a wave length from about 1 to 10 µm.

Adjacent to the infrared ray heater 9, a pair of compaction rollers 15 and 15' retained at a fixed temperature are provided, for pressing the glass cloth substrate impregnated with the matrix resin by the infrared ray heater 9 to have the resin unified and smoothed. Further, it is required to restrain the resin from adhering to the rollers 15 and 15' and, in order to reduce the adhesion properties of the rollers 15 and 15' with respect to the resin, the rollers 15 and 15' are subjected to a special working by means of Teflon (TM) coating or a silicone rubber covering.

Figure 10:
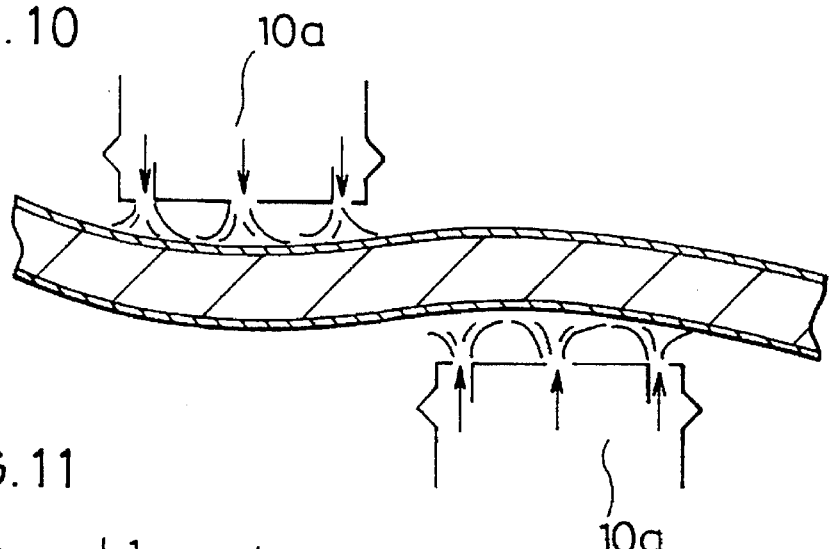
FIG. 10 is a schematic explanatory view of nozzles of a floating heater applied to the manufacturing apparatuses of FIGS. 1–9.

Next, a floating dryer 10 is provided for semi-hardening the matrix resin with which the glass cloth substrate A is impregnated. This floating dryer 10 is arranged in non-contact type for heating the substrate A in a floated state with a heated fluid injected from above and below to the glass cloth substrate A out of a plurality of nozzles 10a, as shown in FIG. 10. As the heated fluid, air or nitrogen is used preferably. Further, an optimum cutter device (not shown) for cutting the prepreg sheet B into pieces of a predetermined length is provided adjacent to the floating dryer 10.

This semi-hardening heating is not limited to be one by the floating dryer, but any heating means may be employed so long as the same is of the non-contact type heating unit.

Figure 11:
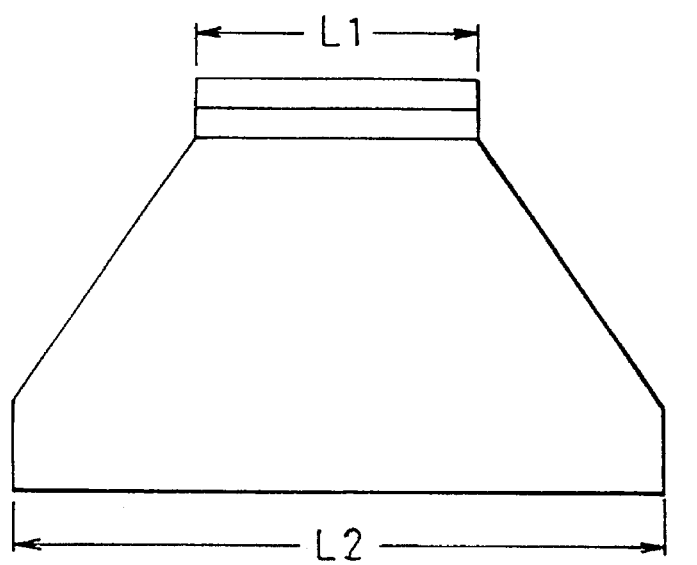
FIG. 11 is an explanatory view for showing a ratio of resin flow lines respectively at a gear pump of die coater and at a coating section in the manufacturing apparatus of FIG. 1.

The coater 7 of the gear pump in die type employed in the present apparatus is set to have a ratio of resin flow line L1 of the gear pump to resin flow line L2 of the coater at its lip portion to be $0.9 < L2/L1 < 3$, as shown in FIG. 11, whereby any flow of the resin in width direction within the die is eliminated, and resin discharge at the lip portion is made uniform. Since the gear pump is disposed extremely in proximity to the lip portion, internal pressure of the resin can quickly rise, and extremely rapid rise in the coating can be realized. In contrast to conventional die coater, any substrate loss required for the rise can be restrained to be about $1/3$ to $1/5$. Further, while the coating material beyond the pump is unable to be discharged and made to be all loss, such loss of the coating material can be also reduced. Further, a uniform heating by means of a heat medium or the like is also easily attainable when an integral formation is employed, so that so many advantages can be provided.

The process for manufacturing the prepreg by means of the apparatus arranged as in the foregoing shall be described in the followings. First, the matrix resin obtained by fusing, mixing and metering the resin composition containing epoxy resin, hardener, hardening promotor and so on is supplied from the matrix supply device R through the hopper 6 to the coater 7 of the gear pump in die type.

On the other hand, the glass cloth substrate A wound on the unwinder 1 is supplied through the accumulator 2 to the back-up roller 8, where one surface of the glass cloth substrate A is uniformly coated with the matrix resin discharged from the coater 7. For the glass cloth substrate in this case, one of a woven mesh from 20 to 1,000 g/m² may be employed. After the mixing of the main component of epoxy resin with resin or resins containing the hardener, hardening promotor and so on, the residence time until the mixture is discharged from the lip portion of the coater 7 should preferably be less than 20 minutes. This is for the reason that, when it exceeds 20 minutes, the hardening reaction advances partly so that the unification of quality and the stability of manufacturing become difficult to be maintained. Accordingly, more preferable is less than 15 minutes. Further, the viscosity of the resin at the time of the foregoing coating should preferably be 1,000 to 30,000 cPS. This is because, with the viscosity less than 1,000 cPS, the metering stability of the resin at the gear pump is deteriorated, the viscosity becomes excessively low so that the impregnability of the resin into the fibrous sheet-shaped reinforcing substrate will become excessive enough for infiltrating over to the other surface, and the resin will adhere to the back-up roller so as to cause the substrate to be hard to stably move. When 30,000 cPS is exceeded, on the other hand, the spreadability of the resin is deteriorated, and the uniform coating with respect to the fibrous sheet-shaped reinforcing substrate becomes difficult.

Next, during the passing of the glass cloth substrate A coated with the matrix resin through the infrared ray heater 9, the matrix resin is caused to infiltrate into the glass cloth substrate A and is further pressurized by the compaction rollers 15 and 15' to be unified and smoothed. In this case, the resin can be pressurized and smoothed with a low pressure at a state where the heat history is still low and the hardening reaction has not advanced, so that the mesh of the glass cloth can be prevented from being distorted.

Next, while being passed through the floating dryer 10, the matrix resin is semi-hardened. In this case, the atmospheric temperature in the floating dryer 10 is 120° to 200° C., and the processing time is 20 to 300 seconds, to be within a range of tolerance.

Then, the prepreg sheet B obtained through the floating dryer 10 is cut into predetermined size by means of a not-shown sheet cutter. At this time, it is also possible to reel up the prepreg sheet B into a roll, without cutting.

Figure 2:
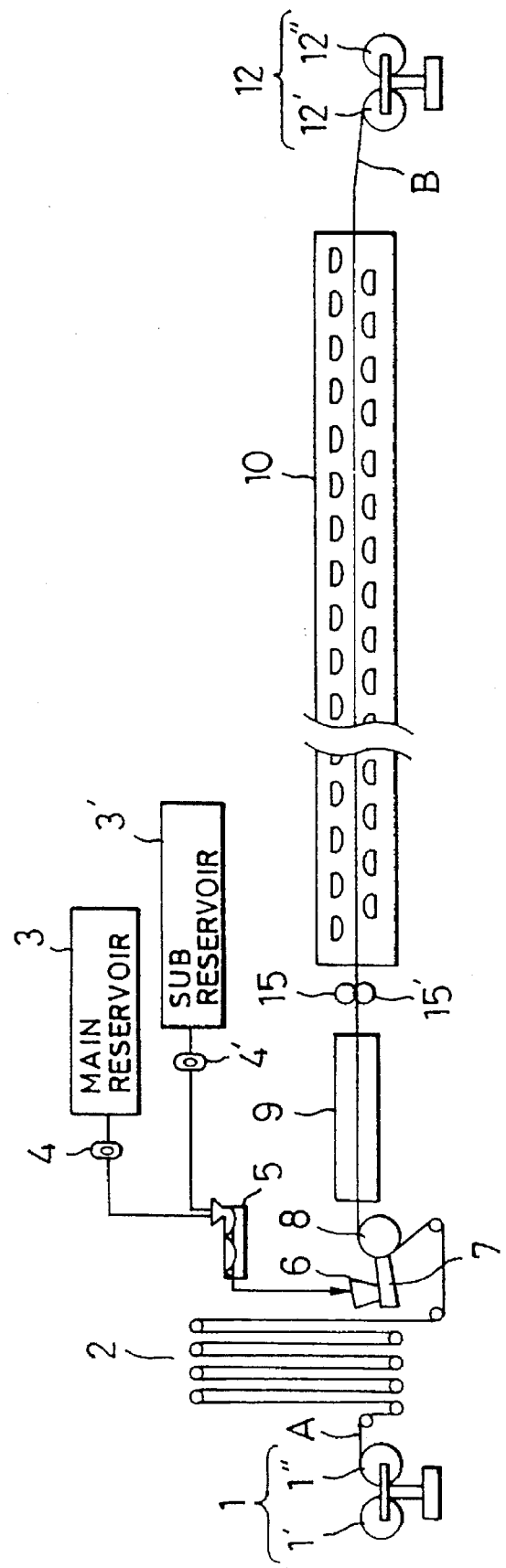
FIG. 2 is a schematic explanatory view of another apparatus for working the process for manufacturing composite materials of Examples 1 to 6 according to the present invention and Comparative Examples 4 and 5.

On the other hand, such arrangement as shown in FIG. 2 may be employed instead of the foregoing supply device R of the matrix resin. Referring thereto in detail, there are provided a main reservoir 3 for receiving the main component of epoxy resin and a subsidiary reservoir 3' for receiving the subsidiary component containing any other resin, the hardener, hardening promotor and so on, and metering pumps 4 and 4' are connected to the respective reservoirs 3 and 3' for metering the main and subsidiary components. Further, to the metering pumps 4 and 4', a stationary mixing device 5 provided with static mixers of 12 to 24 stages for uniformly mixing the main component and the subsidiary component to obtain the desired matrix resin is connected, while the arrangement further connects to the mixing device 5 the coater 7 of the gear pump in die type, through the hopper 6. Other respects of the arrangement are the same as in the foregoing apparatus shown in FIG. 1.

In the arrangement of FIG. 2, the main component of epoxy resin and subsidiary component containing any other resin, hardener, hardening promotor received in the main and subsidiary reservoirs 3 and 3' respectively, in fluidizing state, are metered in a predetermined amount by means of the metering pumps 4 and 4', and then are mixed uniformly in the stationary mixing device 5 to obtain the matrix resin. This matrix resin is further supplied through the hopper 6 to the coater 7 of the gear pump in die type. In this event, the die coater employed in the present invention should preferably be one controllable for allowing the resin to be discharged from the lip portion in a uniformly distributed state, while other die coater of ultra coat die type than the foregoing gear pump in die type die coater may also be employed.

This ultra coat die type coater is featured in that a lip plane of the die lip and the member to be coated (glass cloth substrate) are in extremely proximity to each other but are not in contact with each other, and the coating fluid (matrix resin) is always interposed between them and is fluidizing. The matrix resin discharged out of the lip slot flows out between the lip plane and the glass cloth substrate. Since at this time the glass cloth substrate is always moved in a fixed direction and at a fixed velocity, the matrix resin caused practically to pass through between the lip plane and the glass cloth substrate. That is, a large shearing stress is applied to the matrix resin at the time when it passes through a gap between the lip plane and the glass cloth substrate at a certain flow rate, an abrupt change in the viscosity is caused to occur to be provided with a fixed film forming force, and the matrix resin is made to coat over the glass cloth substrate in smooth manner. The flow rate at this time of the matrix resin is determined by pumping amount and moving velocity of the glass cloth substrate. Further, such roll unit as the compaction rollers and the like may also be disposed at any position of before and after the semi-hardening step and between divided halves of the semi-hardening step, or even at a plurality of such positions simultaneously. It is also possible to employ a heater with internal air circulation, other than the infrared ray heater, as the non-contact type heating unit for use in the step of impregnating the sheet-shaped reinforcing substrate with the matrix resin.

For the matrix resin, other than epoxy resin, such thermosetting resins as unsaturated polyester resin, polyurethane resin, vinyl ester resin and the like may also be employed. For the sheet-shaped reinforcing substrate, it is also possible to employ, other than the glass fiber cloth, cloths of such organic fibers as aromatic polyamide fiber, aromatic polyester fiber and the like, carbon fibers and the like, as well as unidirectional fiber sheet and random arrangement non-woven sheet.

In the followings, a concrete process employing such manufacturing apparatuses as shown shall be described to details.

EXAMPLE 1

A glass cloth substrate of a thickness 180 μm and a woven mesh of 205 g/m² (a product WE-18K-BY-58 of a Japanese firm NITTO BOSEKI KABUSHIKI KAISHA) was supplied from the unwinder 1 through the accumulator 2 to the back-up roller 8 to be coated by the coater 7. A matrix resin was prepared by mixing, in the mixing device 5 with a residence time within the device of 1 minute, a composition COMP1 consisting of bisphenol epoxy resin as a main component and containing bromine, the composition COMP1 being maintained in the main reservoir 3 in liquid state at 60° C. and metered through the metering pump 4, with an epoxy resin composition COMP2 containing dicyandiamide as a hardener as well as a hardening promotor, the composition COMP2 being maintained in the subsidiary reservoir 3' at 60° C. and metered through the metering pump 4', and was supplied to the hopper 6 kept at 60° C. The glass cloth substrate was coated at the lip portion of the gear pump in die coater (L2/L1=1.1) 7 with the matrix resin supplied to the hopper 6 and metered through the coater 7 to be of a uniform thickness at the resin viscosity of 10,000 cPS and resin content of 145 g/m², and was sent by the back-up roller 8 to the infrared ray heater 9. At this time, the residence time of the matrix resin from the inlet port of the mixing device to the outlet port of the coater was 10 minutes.

Next, at the infrared ray heater 9, the atmosphere temperature at the center of the heater was controlled to 150°±3° C., and the glass cloth substrate A was passed through the heater 9 to run therein for 5 seconds, to cause the resin coated on the top surface of the substrate to infiltrate through the interior of the glass cloth to the bottom surface. Then the substrate was pressurized under a pressure of 5 kg/cm² by means of the compaction rollers 15 and 15' controlled to be of a surface temperature of 50°±3° C. to have the resin unified with a mechanical pressure provided thereto.

Further, the substrate A carrying the matrix resin was made to run for 60 seconds through the floating dryer 10 in which a plurality of nozzles 10a for ejecting a heated gas were disposed above and below as shown in FIG. 10, so that the resin was subjected to a semi-hardening step, whereby a prepreg in the form of a fiber reinforced sheet of the glass cloth substrate impregnated with the thermosetting resin was obtained and subsequently reeled on the reeler 12.

It has been found that, in the present arrangement of steps, the melt residence time was shortened to be able to prevent any trouble of hardening at the coater, since the main epoxy resin component and subsidiary composition containing the hardener and so on were separately metered and supplied to be quickly mixed at the stationary mixer.

Further, with the use of the coater of the gear pump in type not provided with conventional narrow elongated cylinder and screw, the shear in the molten state was low, causing no heat generation due to the shear, and the film-forming properties were excellent. Further, the sheet-shaped prepreg obtained was excellent in the uniformity in the thickness and in the impregnation properties, and there was recognized no void at all even when the top surface was observed through a magnifying glass of 30 times magnification. Further, the coefficient of hardening reaction representing the extent of semi-hardening was 48%, and the tackiness was excellent.

Figure 12:
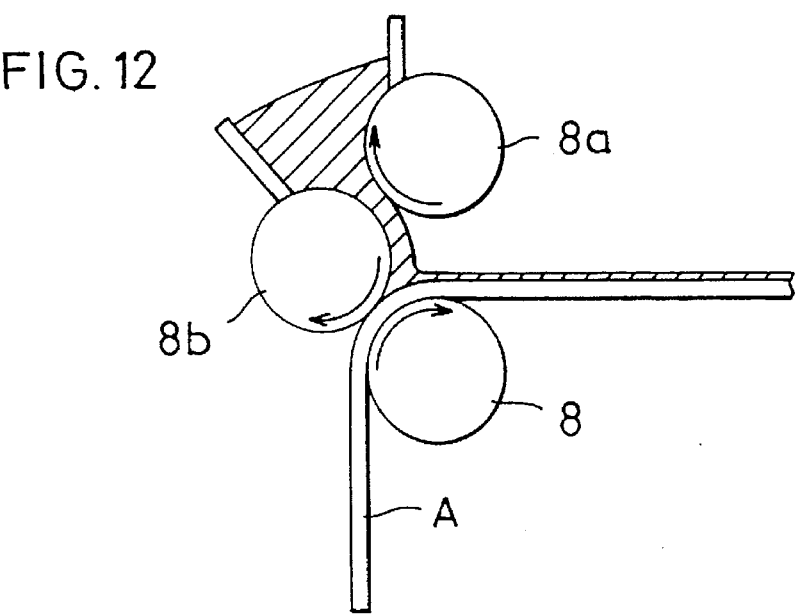
FIG. 12 is a schematic view showing a main part structure of top-feed reverse roll coater employed in Comparative Examples 1–3.

Next, as comparative examples with respect to the foregoing Example 1, a case employing a coating process by means of such top feed reverse roll coater as shown in FIG. 12, in place of the coating by means of the gear pump in die type, shall be described.

Comparative Examples 1–3

In the present Comparative Examples, a top feed reverse roll coater comprising three rolls of an effective length 550 mm (fusing and metering roll 8a, coater roll 8b and back-up roll 8) was employed, a resin composition of a main epoxy resin component of the same bromine epoxy resin as that employed in Example 1 and containing the hardner consisting of dicyandiamide and a compound of imidazoles was varied in the melt viscosity to be 8,000 cPS, 20,000 cPS and 50,000 cPS, the same type of glass cloth substrate (WE-18K-BY-58 of NITTO BOSEKI) of the thickness 180 μm and the mesh 205 g/m² as that used in Example 1 was supplied from the unwinder to the roll coater, to be coated with the resin composition to be of the coating width 500 mm, running velocity 10 m/min, and resin coating rate of 145 g/m² and the substrate was reeled.

Such results as shown in a following TABLE I were obtained in respect of the coating state, the strike-through of the resin to the reverse surface of the glass cloth, and the adhesion and running reel properties with respect to the back-up roll. Stable coating was difficult under any conditions.

TABLE 1

| | Melt Visc. of Resin Upon Coating (cPS) | Coat'g State of Resin to Glass Cloth | Strike-Thru. of Resin to Reverse Side of Gls. Clth. | Adhesion & Running Prop. to Back-Up Roll | Total Appraise |
| --- | --- | --- | --- | --- | --- |
| Comp. Ex. 1 | 8,000 | O | Much | Much ×  | × |
| Comp. Ex. 2 | 20,000 | O | Slightly | Slt. Much × | × |
| Comp. Ex. 3 | 50,000 | × | Less | Less × | × |

Figure 3:
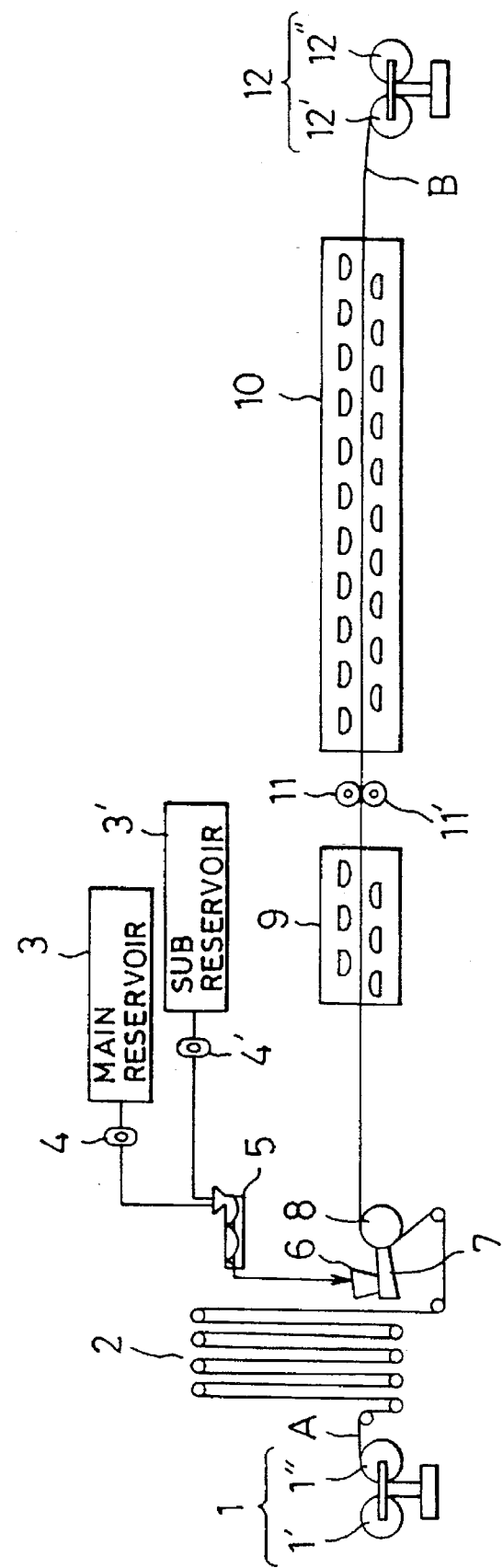
FIG. 3 is a schematic explanatory view of another apparatus for working the process in respect of Examples 7 to 10 according to the present invention and Comparative Examples 6 and 7.

The same process as in Example 1 was worked with manufacturing apparatuses shown in FIGS. 2 and 3, and the prepreg was made with the type, temperature and processing time for performing the impregnating step, the rest under the same conditions as those in EXAMPLE 1. In the apparatus of FIG. 3, a floating dryer 9' was employed in place of the infrared ray heater 9 of FIG. 2.

TABLE II

| Type of Heater | Example | Atmos. Temp. (°C.) | Proc. Time (sec.) | Visual Discrimination of Impregnation & Surface Properties |
| --- | --- | --- | --- | --- |
| Infrared Ray Heater | Comp. Ex. 4 | 100 | 200 | × - insuf. impreg. |
| | Ex. 2 | 120 | 120 | Δ |
| | Ex. 3 | 150 | 20 | O |
| | Ex. 4 | 200 | 10 | O |
| | Ex. 5 | 250 | 5 | O |
| | Ex. 6 | 300 | 3 | O |
| | Comp. Ex. 5 | 330 | 3 | × - colored |
| Hot-Air Inject. Float'g Heater | Comp. Ex. 6 | 100 | 120 | × - insuf. impreg. |
| | Ex. 7 | 120 | 120 | Δ |
| | Ex. 8 | 150 | 20 | O |
| | Ex. 9 | 200 | 10 | O |
| | Ex. 10 | 300 | 3 | O |
| | Comp. Ex. 7 | 330 | 3 | × - colored |

In the above TABLE II, "o" denotes excellent impregnation and surface properties, "Δ" denotes fairly excellent impregnation and surface properties, and "x" represents poor impregnation and surface properties.

EXAMPLES 11–14

Comparative Examples 8 and 9

In EXAMPLES 11–14, the prepreg was manufactured through the same process and under the same conditions as in EXAMPLE 1, while modifying the atmosphere temperature and processing time upon the semi-hardening. In the floating heater, twenty floating nozzles as shown in FIG. 10 were disposed on each of upper and lower sides, and varying the atmosphere temperature by altering the hot-air temperature and the heating process time by altering the running velocity, for manufacturing the prepreg, whereby such results as shown in a following TABLE III were obtained.

TABLE III

| Example | Atmos. Temp. (°C.) | Proc. Time (sec) | Resin Hardening React. Coef./ Tackiness | | Surface Color Tone | Total Apprs. |
| --- | --- | --- | --- | --- | --- | --- |
| Cmp. Ex. 8 | 100 | 300 | 0 | Large | O | × |
| Ex. 11 | 120 | 300 | 3 | Middle | O | Δ |
| Ex. 12 | 150 | 90 | 45 | Nil | O | O |
| Ex. 13 | 170 | 60 | 68 | Nil | O | O |
| Ex. 14 | 200 | 20 | 45 | Nil | O | O |
| Cmp. Ex. 9 | 220 | 20 | 60 | Nil | × | × |

In the above TABLE III, the hardening reaction coefficient of the resin was obtained through a following formula, with the calorific value of the resin before and after the semi-hardening processing measured by means of a differential scanning calorimeter (DSC). In this case, DSC measuring conditions were set to be 30° C.+250° C. (10° C./min).

Hardening Reaction Coefficient (%) =
  [(Calorific Value Before Semi-Hardening Heating Process) −
  (Calorific Value After Semi-Hardening Heating Process)]/Calorific
            Value Before Semi-Hardening Heating Process × 100

EXAMPLE 15

Figure 4:
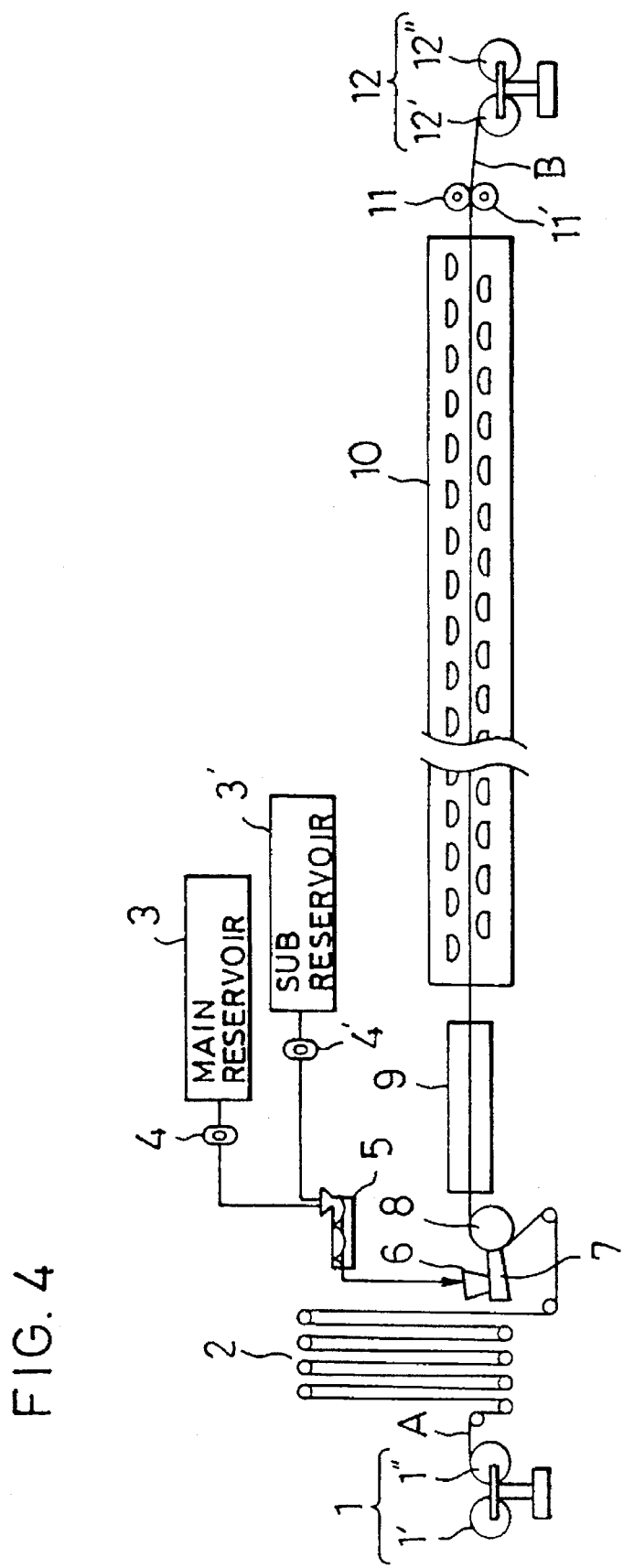
FIGS. 4, 5, 6 and 7 are schematic explanatory views of manufacturing apparatuses for working respective Examples 15–18 according to the present invention.

A manufacturing apparatus which is substantially similar to that in EXAMPLE 1 but, as shown in FIG. 4, the compaction rollers 15 and 15' at the next stage to the infrared ray heater 9 for executing the impregnating step were omitted while compaction, that is, nip rollers 11 and 11' were disposed at next stage to the floating dryer 10 was employed, whereby the glass cloth substrate the matrix resin of which was semi-hardened while being passed through the floating dryer 10 was pressurized by the compaction rollers 11 and 11' to be unified and smoothed, and a prepreg of composite material in the fiber reinforced sheet was obtained.

EXAMPLE 16

Figure 5:
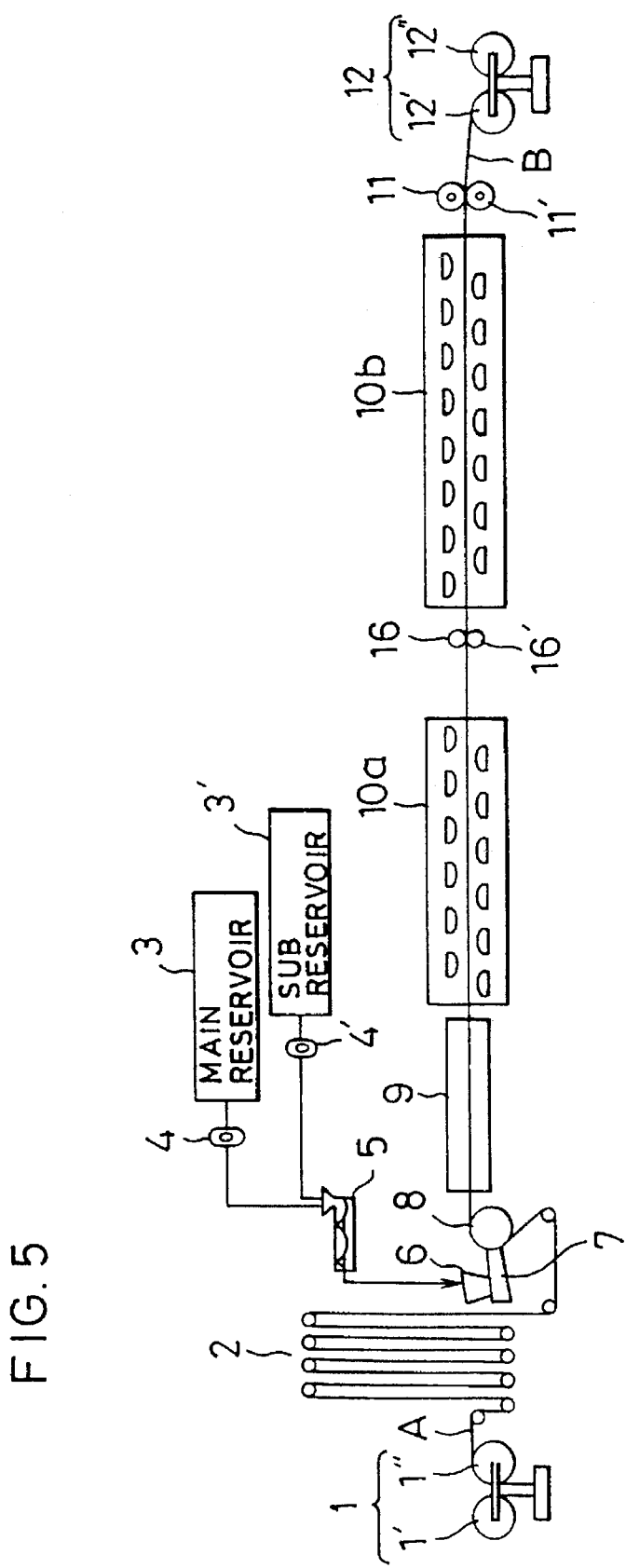

In EXAMPLE 16, a manufacturing apparatus substantially the same as that in EXAMPLE 15 except that, as shown in FIG. 5, the floating dryer for performing the semi-hardening step was divided into a front part 10a and a rear part 10b, with compaction rollers 16 and 16' interposed between them, was employed.

Consequently, the fibrous sheet-shaped reinforcing substrate coated with the resin was heated at the infrared ray heater 9 so as to cause the resin to infiltrate into the substrate, thereafter the resin was semi-hardened at the front part floating dryer 10a, the substrate was pressurized by the compaction rollers 16 and 16' kept at a fixed temperature to be unified and smoothed, and the resin was made again to be semi-hardened through the rear part floating dryer 10b. In the present Example, the effect of maintaining the pressurizing force of the compaction rollers to be proper, and restraining any adhesion of the resin to the compaction rollers could be further improved.

EXAMPLE 17

Figure 6:
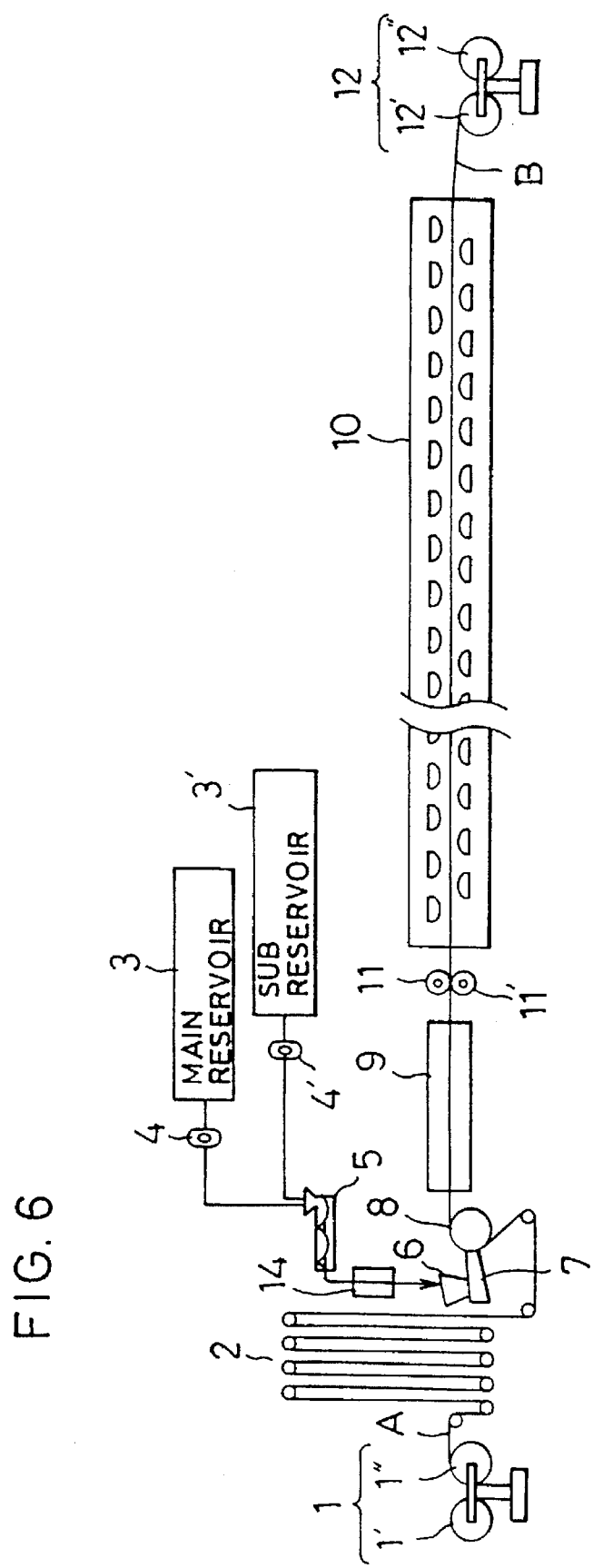

In EXAMPLE 17, a manufacturing apparatus substantially the same as that in EXAMPLE 1 except that, as shown in FIG. 6, a filter unit 14 was interposed between the stationary mixing device 5 and the hopper 6 connected to the gear pump in die type coater 7. In this case, an elimination of any bubbles produced at the mixing device 5, that is, the deaelation was carried out by means of the filter unit 14, so that a filtration for restraining any occurrence of void in the resin and at the same time for eliminating any impurities was performed, whereby it was enabled to improve the quality of the prepreg manufactured.

Here, the resin passing through the filter unit 14 should preferably have a viscosity of 1,000 to 30,000 cPS. This is because, the fusing temperature is required to be elevated in order to render the resin viscosity to be less than 1,000 cPS and, as the fusing temperature rises excessively, the hardening is caused to start occurring, and the unification of quality and stable manufacturing become difficult. Further, when 30,000 cPS is exceeded, a pressure loss upon the deaelation and filtration during the transfer of resin will become excessive, and a smooth transfer, effective deaelation and filtration can no more be attained. The filter unit may also be disposed for performing the filtration before the resin is charged in the main and subsidiary reservoirs 3 and 3'.

EXAMPLE 18

Figure 7:
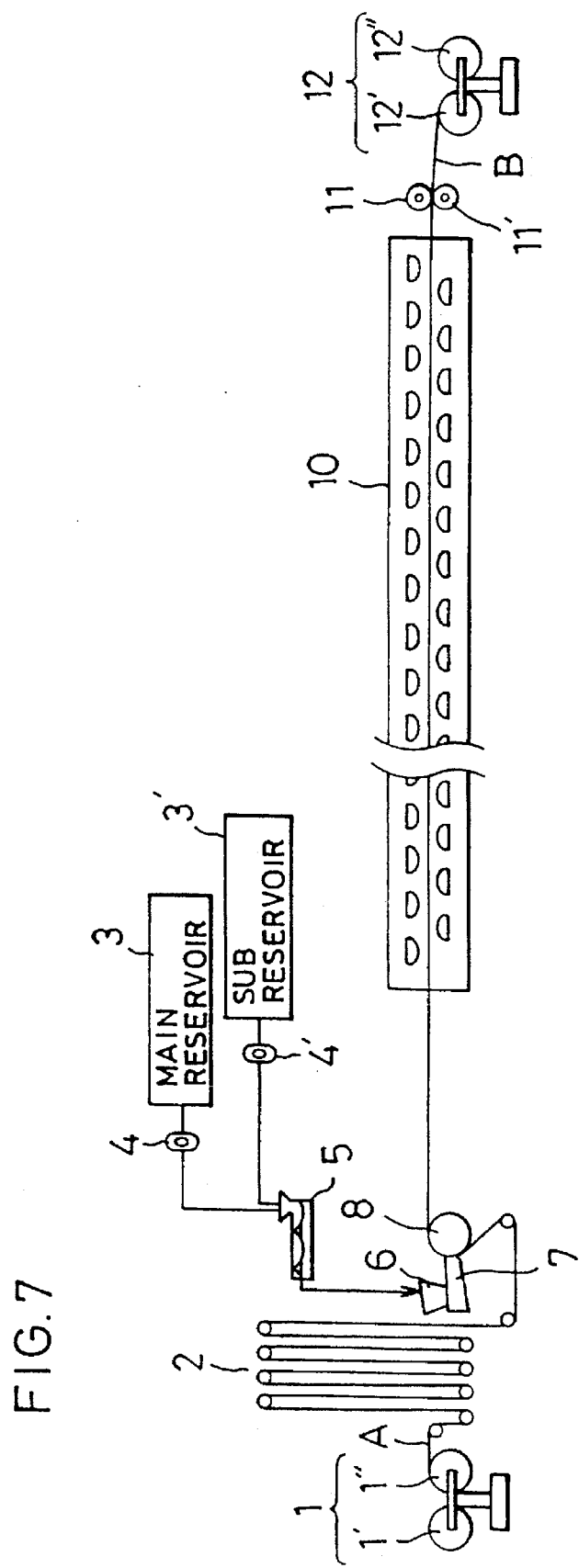

In EXAMPLE 18, the arrangement is so made that, while substantially the same as in EXAMPLE 15, the infrared ray heater 9 in EXAMPLE 1 is omitted as shown in FIG. 7, and the impregnating and semi-hardening steps are practiced commonly by the floating dryer 10. In this case, the impregnating step is to be performed at front half of the floating dryer 10 while the semi-hardening step is carried out at rear half of the dryer. At this time, a glass cloth of a relatively low mesh (about 20 to 200 g/cm$^2$) was coated with a resin of a lower viscosity of 1,000 to 10,000 cPS, and then the impregnation with the resin well advanced even with the infrared ray heater 9 omitted, and the impregnation properties could be made excellent with a heating effect at part adjacent to the inlet port of the floating dryer added.

EXAMPLE 19

In EXAMPLE 19, the same glass cloth substrate, resin composition and apparatus as those in EXAMPLE 1 were employed, and the presence and absence of any abnormal residence of the resin in the coater were investigated by variously modifying the ratio of the resin flow line L1 of the gear pump in the gear pump in die type coater with respect to the resin flow line L2 at the coater lip portion. In discriminating the presence and absence of the abnormal resin residence in the coater, a resin composition with which a blue dye of 0.1 weight % was uniformly mixed was first used, thereafter a resin composition uncolored was discharged in a volume three times as much as the resin residence volume at a portion from the outlet of the gear pump to the coater lip portion, and then color distribution was visually discriminated with the coater opened, results of which were as shown in a following TABLE IV.

TABLE IV

| L2/L1 Ratio | 3.5 | 2.5 | 1.1 |
|---|---|---|---|
| Extent of Abnormal Residence | Δ | ○ | ⊙ |

It has been found that, as will be clear from the above TABLE IV, the ratio L2/L1 of the resin flow line L1 at the gear pump of the coater to the resin flow line L2 at the lip portion of the coater should optimumly be 1.1.

Figure 8:
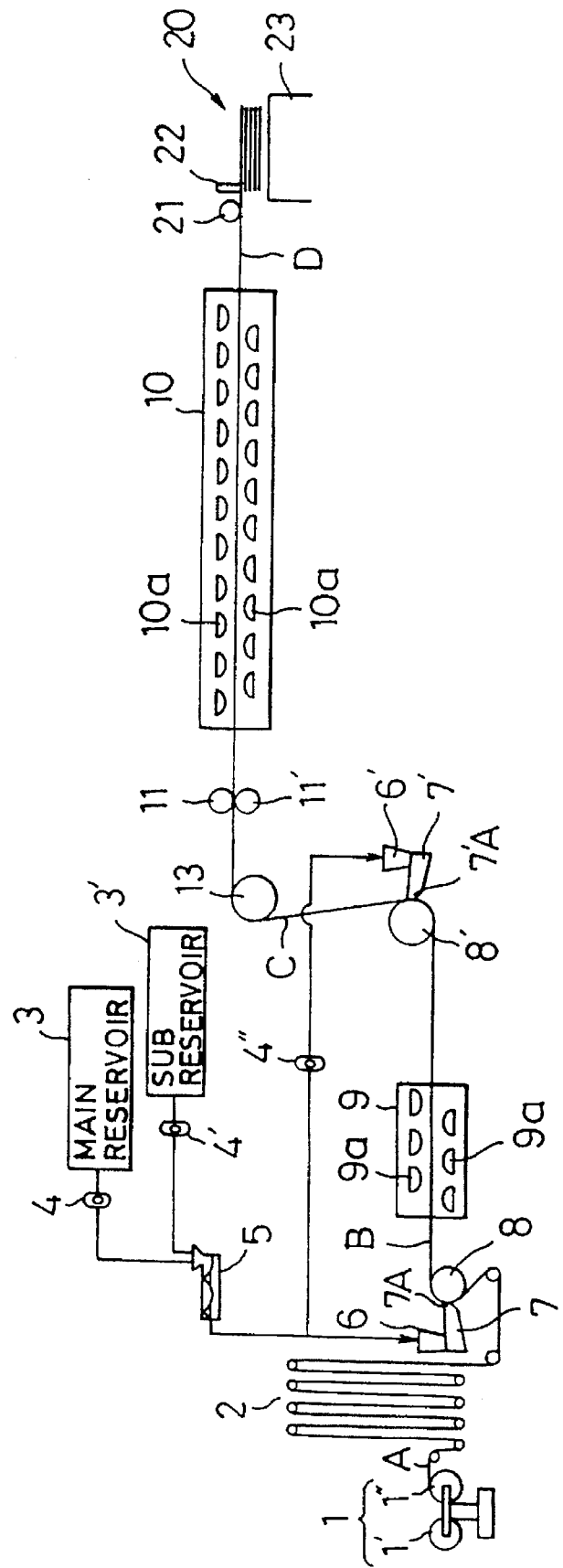
FIG. 8 is a schematic explanatory view of another apparatus for working the manufacturing process according to the present invention.

In FIG. 8, there is shown another aspect according to the present invention, in which the glass cloth substrate A is supplied to the manufacturing apparatus from the unwinder 1 which comprises a roller 1' carrying the glass cloth substrate A and a take-over roll 1", and an accumulator 2 is provided adjacent to this unwinder 1. This accumulator 2 functions to enable the manufacturing apparatus to continuously operate upon change-over between the roller 1' and the take-over roller 1". Adjacent to the accumulator, further, the back-up roller 8 is disposed. In this case, the glass cloth substrate A is supplied by the unwinder 1 and accumulator 2 towards a first back-up roller 8 at a fixed speed in sequential manner. Onto one surface of the glass cloth substrate A supplied from the accumulator 2 to the position of the back-up roller 8 at the fixed speed, an epoxy resin containing the hardener, that is, the matrix resin in molten state and containing substantially no solvent is applied to coat the surface by means of the first gear pump in die type coater 7, at a uniform thickness.

In the present EXAMPLE, further, the heater 9 is provided along transport path of the glass cloth substrate A and on downstream side of the first back-up roller 8, and a second back-up roller 8 is further disposed on downstream side thereof. At this time, the heater 9 functions to promote that the matrix resin coated by the first die coater 7 is impregnated in the glass cloth substrate B. For the heater 9, the floating dryer may be used. The floating dryer is a non-contact type heating unit and, similarly to the foregoing Examples, the heated fluid is ejected from a plurality of the nozzles 9a to top and reverse sides of the glass cloth substrate B, for heating the substrate B in its floated state. For the heating fluid, air or nitrogen gas should preferably be used. As the heater 9, it is also possible to employ the non-contact heater of the type in which the infrared ray heaters are provided above and below, instead of the foregoing floating dryer, so as to have the member to be heated, that is, the glass cloth substrate B passed through intermediate path between the heaters. The infrared ray heaters should preferably be of a wave length of about 1 to 10 μm. Further, the infrared ray heater should preferably be disposed along with an internal hot-air circulator for elevating the uniformity of the atmosphere temperature.

As the glass cloth substrate B is effectively impregnated with the matrix resin while being passed through the interior of the heater 9, the tolerance of the atmosphere temperature within the heater 9 is 120° to 400° C., and the processing time of 5 to 60 seconds.

As a second die coater 7', the same gear pump in die type as the first die coater 7 may be used, so that the other surface, that is, the opposite surface to that resin-coated by the first die coater, of the glass cloth substrate B supplied at the fixed speed towards the position of the second back-up roller 8' is subjected to the coating at a uniform thickness with the epoxy resin containing the hardener, that is, the matrix resin in molten state substantially without any solvent.

The foregoing first and second back-up rollers 8 and 8' may be identical ones to each other, and their surface of metallic roll made of SUS, for example, should preferably be coated, for improving the releasing properties of resin, with fluoroplastic represented by polytetrafluoroethylene (PTFE), tetrafluoroethyleneperfluoroalkyl vinyl ether copolymer (PFA), hexafluoropropylene-tetrafluoroethylene copolymer and the like, or silicone rubber or the like, while not required to be limited thereto. Further, the back-up rollers 8 and 8' should preferably be of a jacket type to be controllable at a fixed temperature by circulating a predetermined liquid medium within the jacket, while not limited thereto.

To the present manufacturing apparatus, on the other hand, there are provided the main reservoir 3 for receiving the main epoxy resin composition and the subsidiary reservoir 3' for receiving the subsidiary resin composition containing the hardener, hardening promotor and so on, and the metering pumps 4 and 4' for metering the main and subsidiary compositions respectively are connected to these reservoirs 3 and 3'. To the metering pumps 4 and 4', further, the stationary mixing device 5 provided with the 24 staged static mixer is connected for mixing uniformly the main epoxy resin composition and the subsidiary resin composition containing the hardener and obtaining the desired matrix resin.

According to the present invention, as has been described, the first and second die coater 7 and 7' are disposed along the transport path of the glass cloth substrate A and, consequently, the mixing device 5 is connected through the hopper 6 to the first die coater 7 and, at the same time, through further metering pump and hopper 6' to a second die coater 7'. The further metering pump 4" is provided for controlling the supply rate of the matrix resin to the second die coater 7', and the matrix resin supply rate from the mixing device 5 is normally set to be, preferably, about 60 to 80% to the first die coater 7 and about 40 to 20% to the second die coater 7'. If the resin supply rate to the first die coater would be less than 60%, it would be difficult to substitute the resin for air bubbles in the substrate during the impregnation, and, if the rate would exceed 80%, the resin supply rate to the second die coater would be less than 20% so as to render the prepreg uniformly coated with the resin and of smoothed surfaces to be difficult to be obtained.

Thus, in the present Example, the main epoxy resin component, i.e., the epoxy resin composition COMP1 is contained in the main reservoir 3 while the resin component containing the hardener, hardening promotor and so on, i.e., the epoxy resin composition COMP2 is contained in the subsidiary reservoir 3', respectively in accordance with their fluidizing state, predetermined amounts of the respective compositions as metered through the metering pumps 4 and 4' connected to the main and subsidiary reservoirs 3 and 3' are uniformly mixed in the stationary mixing device 5, and the matrix resin in molten state and containing substantially no solvent is obtained. While this matrix is supplied through the hoppers 6 and 6' to the first and second die coaters 7 and 7', it is preferable that the main and subsidiary epoxy resin compositions COMP1 and COMP2 are filtered respectively separately or after being mixed, at the viscosities 1,000 to 500,000 cPS of the respective resins, while being led from the discharge ports of the compositions of the respective reservoirs to the hoppers 6 and 6' of the first and second die coaters 7 and 7'.

Further, the lip portions 7A and 7'A of the first and second die coaters 7 and 7' are disposed to closely oppose the back-up rollers 8 and 8', so that the same matrix resin supplied from the mixing device 5 will be applied not only to the top surface but also to the reverse surface of the glass cloth substrate through the lip portions 7A and 7'A for coating them.

Instead of the mixing device 5, on the other hand, it is also possible to arrange an extruder type device having fusing and mixing functions for being supplied with the matrix resin consisting of epoxy resin, hardener, hardening promotor and so on, the matrix resin being supplied to the first and second die coaters 7 and 7' after being fused, mixed, deaerated and so on.

Thus, according to the present Example, the one surface of the glass cloth substrate A supplied at a fixed speed from the accumulator 2 to the position of the back-up roller 8 is coated at the uniform thickness with epoxy resin containing the hardener and so on, i.e., the matrix resin in molten state substantially without any solvent, the matrix resin being then caused to infiltrate into the glass cloth substrate B by the action of the infrared ray heater 9, and thereafter the other surface, i.e., the surface opposite to the resin-coated surface through the first die coater of the glass cloth substrate B supplied at the fixed speed towards the position of the second back-up roller 8' is coated in the uniform thickness with the matrix resin of epoxy resin containing the hardener and the like in the molten state without containing substantially no solvent by means of the second die coater 7'.

Further, the first and second die coaters 7 and 7' of the gear pump in die type as employed in the present Example should preferably be set to have the ratio (L2/L1) of the resin flow line L2 at the coater lip portions 7A and 7'A to the resin flow line L1 at the incorporated gear pump to be 1<L2/L1<3, whereby such useful advantages as has been described in the foregoings with reference to FIG. 11 in the Example of FIG. 1 can be obtained similarly to the Example of FIG. 1.

Further, the residence time of the mixed matrix resin of the main epoxy resin composition with the subsidiary resin composition consisting of the hardener, hardening promotor and so on as set to be less than 20 minutes, as well as the resin viscosity upon the coating by means of the first and second die coaters 7 and 7' are also made the same as in EXAMPLE 1.

For the glass cloth substrate A, one having the mesh of 50 to 500 g/m$^2$ may be applied, and the coating amount of the matrix resin, that is, the resin content is made normally to be 40 to 500 g/m$^2$. The matrix resin supply rate from the mixing device 5 is so arranged as to be about 70% to the first die coater 7 and about 30% to the second die coater 7' as has been described, so that the one surface of the glass cloth substrate A will be coated at the first coating step by means of the first die coater 7 to be 28 to 350 g/m$^2$, normally 35 to 320 g/m$^2$, and the other surface of the glass cloth substrate B will be coated at the second coating step by means of the second die coater 7' to be 12 to 150 g/m$^2$, normally 15 to 120 g/m$^2$.

According to the present Example, therefore, the first and second coating steps by means of the first and second die coaters 7 and 7' are performed, so that the matrix resin can be coated extremely excellently onto both surfaces of the glass cloth substrate, uniformly and without involving any void.

For the first and second die coaters 7 and 7', in this case, it is preferable that one capable of controlling the discharge of the resin from the lip portions 7A and 7'A to be in uniformly distributed state, and, while the gear pump in die type die coater has been referred to as to be employed, an ultracoat die type die coater may also be employed.

In this ultracoat die type coater, the die lip plane is made extremely close to the member to be coated (the glass cloth substrate), but they are in non-contact relationship, and the coating liquid (matrix resin) is always interposed between them in fluidizing state. The matrix resin discharged from the lip slot flows into the gap between the lip plane and the glass cloth substrate. Since at this time the glass cloth substrate is always being moved in a fixed direction at a fixed speed, the matrix resin is made in practice to pass through the gap between the lip plane and the glass cloth substrate. That is, the matrix resin receives a large shearing stress upon passing through the gap between the lip plane and the glass cloth substrate at the predetermined speed, so as to be provided with a fixed film forming ability with a rapid change occurred in the viscosity and thus to be applied smoothly onto the glass cloth substrate. At this time, the flow rate of the matrix resin is determined by the pumping rate and the supply rate of the glass cloth substrate.

Further, the glass cloth substrate C coated and impregnated with the matrix resin is supplied through a direction turning roller 13 disposed adjacent to the second back-up roller 8' to the floating dryer 10, at which the matrix resin infiltrates into the glass cloth substrate for the impregnation, and this matrix resin of impregnation is rendered to be B-staged, that is, semi-hardened.

At this time, preferably, the nip rollers 11 and 11' are disposed between the turning roller 13 and the floating dryer 10. The nip rollers 11 and 11' are maintained at a fixed temperature and hold the glass cloth substrate C from above and below, so that the glass cloth substrate C coated and impregnated with the matrix resin will be fed into the floating dryer 10. Normally, the nip rollers 11 and 11' are heated to be 50° to 150° C. and holds the glass cloth substrate under a pressure of 0.2 to 2 kg/cm$^2$.

The nip rollers 11 and 11' require that the resin adhesion to the rollers 11 and 11' is restrained, and the roller surfaces should be preferably subjected to the special working by means of the Teflon (TM) coating, silicone rubber covering or the like.

The floating dryer 10 is made in the non-contact type, in which, as in the foregoing heater 9, the heated fluid is injected from the plurality of nozzles 10a to both surfaces of the glass cloth substrate C, and the substrate C is heated in the floated state. At this time, air or nitrogen gas should preferably be used as the heated fluid.

While being passed through the interior of the floating dryer 10 in such manner as in the above, the matrix resin is semi-hardened, that is, made to be B-staged, and the atmosphere temperature and processing time in the floating dryer 10 are set to be 120° to 200° C. and 20 to 300 seconds as the tolerance.

The glass cloth substrate with the impregnating resin B-staged as in the above, that is, the sheet-shaped prepreg D is cut into a predetermined size by means of a sheet cutter 20 as shown in FIG. 8. That is, the sheet-shaped prepreg D is cut in its width direction by a slitter 21 and in longitudinal direction by a shearing machine 22, and cut pieces are stacked on a stocker 23 as cut-sheet prepregs. It is also possible, as desired, to reel up the sheet-shaped prepreg by means of a reeler not shown, without cutting into pieces.

While in the above epoxy resin has been employed as the matrix resin, epoxy resins may be used individually so that, for example, one consisting of bromine-containing bisphenolic epoxy resin as a main component and a small amount of polyfunctional epoxy resin, a mixture of more than two epoxy resins, and so on may also be optimumly employed, and, other than epoxy resin, such thermosetting resins as unsaturated polyester resin, polyurethane resin, vinyl ester resin and the like may also be employed.

For the fibrous sheet-shaped reinforcing substrate A, other than the foregoing glass fiber cloth glass cloth), organic fiber cloths of aromatic polyamide fiber, aromatic polyester fiber and the like, carbon fiber cloth, unidirectional fiber sheet of these fibers, random arrangement nonwoven sheet and the like may also be employed. Since the uniformity and resin impregnability for an excellent thickness can be established irrespective of the mesh of the fibrous sheet-shaped reinforcing substrate employed, the sheet-shaped reinforcing substrate A of any optional mesh can be effectively employed.

Figure 9:
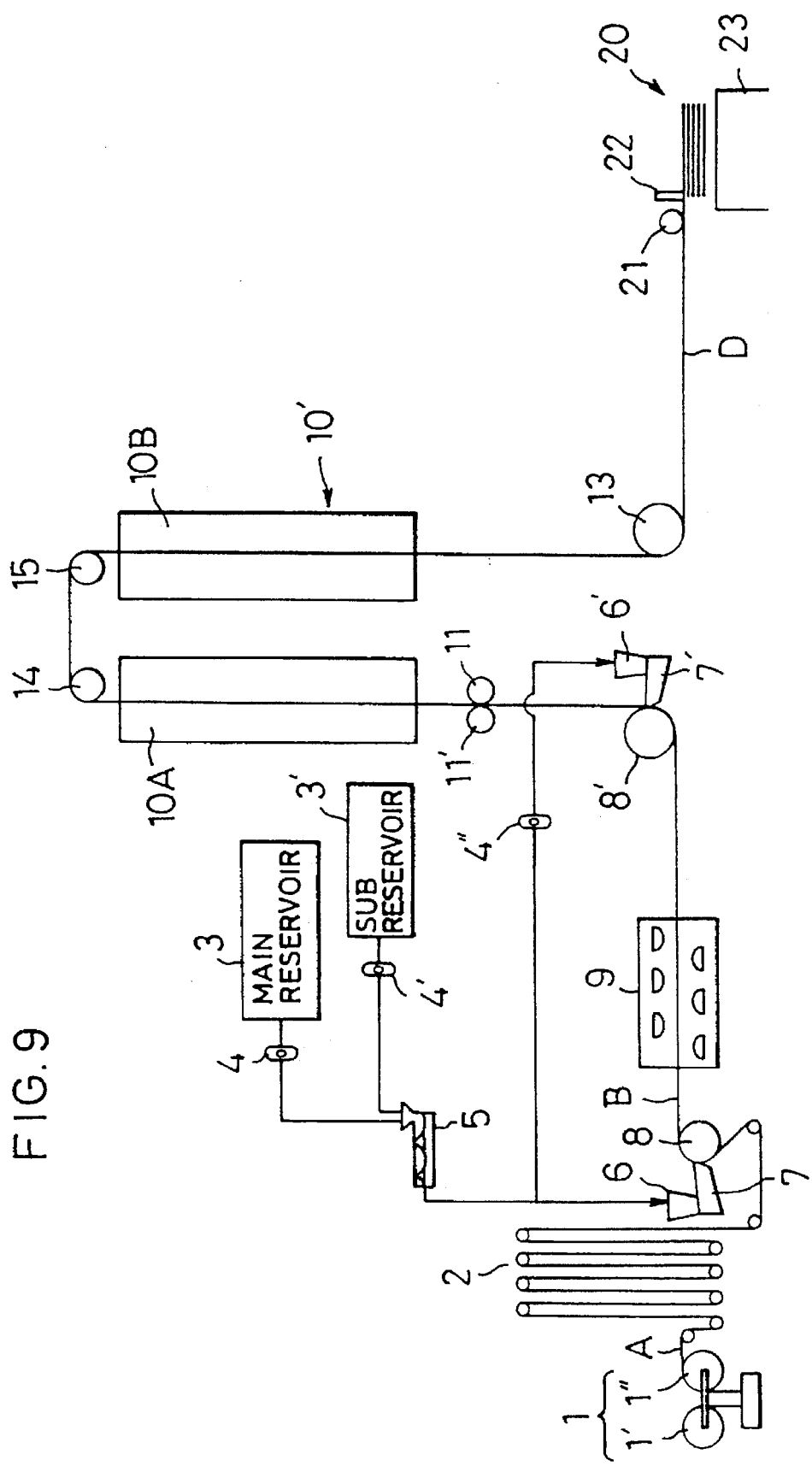
FIG. 9 is a schematic explanatory view of still another apparatus for working the manufacturing process according to the present invention.

While in the foregoing arrangement shown in FIG. 8 the glass cloth substrate C coated and impregnated with the matrix resin is supplied through the turning roller 13 disposed adjacent to the back-up roller 8' to the floating dryer 10 of lateral type disposed in horizontal direction, it is possible to employ the non-contact type heater 10' of upright type disposed in vertical direction as shown in FIG. 9, and the same function and effect as in the arrangement of FIG. 8 can be established.

In concrete, the glass cloth substrate C coated and impregnated with the matrix resin is led by the nip rollers 11 and 11' disposed adjacent to the back-up roller 8' upward into one side heater part 10A of the heater 10' vertically disposed and then, by deflection rollers 14 and 15 into the other side heater part 10B of the heater 10' and, after being supplied downward within the heater part 10B, the substrate is led out of the heater 10' to the exterior. The matrix resin in the glass cloth substrate C is semi-hardened, that is, B-staged while being passed through the heater 10'. The glass cloth substrate of which the impregnating resin is B-staged, that is, the sheet-shaped prepreg D is supplied through the turning roller 13 to the sheet cutter 20, where the sheet is cut into pieces of a predetermined size.

The upright heater 10' in the present Example may also be modified to be the same floating dryer as the foregoing lateral floating dryer 10, but it is also possible to adopt the non-contact type heater provided with the heat-medium type non-contact heater or with the infrared ray heater.

In the arrangement of FIG. 9, too, the matrix resin is semi-hardened to be B-staged while being passed through the heater 10', and the tolerance of the heater 10' is set to be 120° to 200° C. in the atmosphere temperature and 20 to 300 seconds in the processing time.

EXAMPLE 20

In the present Example, the fibrous sheet-shaped reinforcing substrate A used was the glass cloth substrate of a thickness 180 μm and a mesh of 205 g/m$^2$ (WE-18K-BY-58 of NITTO BOSEKI), which was supplied from the unwinder 1 through the accumulator 2 to the back-up roller 8 for the coating by means of the coater. As the back-up roller 8, one of the jacket type in which the surface of SUS-made metallic roller of a roll diameter of 300 mm was coated with hexafluoropropylene-tetrafluoroethylene copolymer (FEP) for improving the resin releasing properties was employed, and the surface temperature of the back-up roller 8 was controlled to be constant by circulating a liquid medium of 35° C. through the jacket.

The matrix resin was prepared by mixing at the mixing device 5, for 1 minute of the residence time in the mixing device, the main composition COMP1 consisting of bromine-containing bisphenolic epoxy resin as the main component and a small amount of polyfunctional epoxy resin, retained in the main reservoir 3 at 105° C. to be in the liquid state and metered through the metering pump 4, with the epoxy resin composition COMP2 containing dicyandiamide (DICY) as the hardener and the hardening promotor of imidazoles, retained in the subsidiary reservoir 3' at 50° C. and metered through the metering pump 4', and the matrix resin was supplied to the hopper 6 kept heated at 105° C.

The resin supplied to the hopper 6 was metered at the first gear pump in die coater 7 (L2/L1=1.1) and was applied at the coater lip portion 7A onto one surface of the glass cloth substrate A to coat it, at a resin viscosity of 6,000 cPS and a resin content of 102 g/m$^2$, to be of a uniform thickness. At this time, the resin residence time from the inlet port of the mixing device 5 to the outlet of the coater 7 was made 10 minutes.

Then, the glass cloth substrate B coated on the one surface with the resin was made to run for 20 seconds through the interior of the floating dryer 9 in which a plurality of nozzles 9a for injecting a hot gas were disposed above and below as shown in FIG. 10, so that the coated resin on the top surface of the glass cloth substrate B was caused to infiltrate into the interior and over to the other bottom surface of the glass cloth substrate for its impregnation. Consequent thereto, the glass cloth substrate B was supplied to the second back-up roller 8' which is the same as the first back-up roller 8.

On the other hand, the same matrix resin as that applied by the first die coater 7 was supplied, as metered through the metering pump 4", to the hopper 6'. The resin supplied to the hopper 6' was applied to the lower surface of the glass cloth substrate B to coat the surface, at the position of the second back-up roller 8' by means of the second die coater 7' employing the same gear pump in die coater as the first die coater 7, to be in a uniform thickness with the resin viscosity of 6,000 cPS and resin content of 46 g/m$^2$.

After the coating, this glass cloth substrate C was sent through the direction turning roller 13 and nip rollers 11 and 11' to the floating dryer 10. The nip rollers 11 and 11' were covered on their surface with a hard silicone rubber and were maintained at a temperature of 80°±1° C. by means of the liquid medium circulation, and the holding pressure between the nip rollers 11 and 11' was 1 kg/cm$^2$.

In the floating dryer 10, the plurality of the nozzles 10a for injecting the hot gas as shown in FIG. 10 were arranged above and below, and the glass cloth substrate C coated and impregnated with the matrix resin was made to run for 60 seconds through the interior of the floating dryer 10 of the atmosphere temperature controlled at 180°±1° C., to have the semi-hardening step performed. The fiber reinforced sheet-shaped prepreg D comprising the glass cloth substrate C completely impregnated with the thermosetting resin was thereby obtained, and was cut into pieces of a predetermined size by means of the sheet cutter 20.

Since in the apparatus employed in the present Example 20 the main epoxy resin composition and the subsidiary composition containing the hardener were separately metered and supplied and were then quickly mixed by means of the stationary mixing device 5, it was possible to shorten the melt residence time and to prevent the trouble of being hardened in the first and second die coaters 7 and 7'. Since the gear pump in die type coaters not provided with any conventional narrow elongated cylinder, screw and the like members were employed as the first and second die coaters 7 and 7', the shear in the molten state could be kept low so as not to cause any heat generation to occur due to the shear, and the film forming properties could be excellent. Further, the obtained sheet-shaped prepreg D was excellent in the thickness uniformity, the resin uniformity on front and rear sides, the smoothness and the impregnability of the resin to the glass cloth substrate, and an observation as magnified 30 times as large has proved that the number of voids was less than 5 pieces/inch$^2$. The hardening reaction coefficient showing the extent of the semi-hardening was 47%, without any tackiness, and the workability in following steps was also excellent.

Comparative Example 10

A prepreg was manufactured with the manufacturing apparatus of FIG. 8 under the same manufacturing conditions and with the same sheet-shaped reinforcing substrate and matrix resin as in EXAMPLE 20, except for the absence of the second die coater 7'. Here, the resin applying rate at the first die coater 7 was made to be 148 g/m$^2$.

The sheet-shaped prepreg D thereby obtained was excellent in the thickness uniformity and the impregnability of the resin with respect to the glass cloth substrate, whereas this prepreg was slightly poor in the resin uniformity on the front and rear sides and in the smoothness on the rear side, and the prepreg was apt to warp at both end portions.

Figure 13:
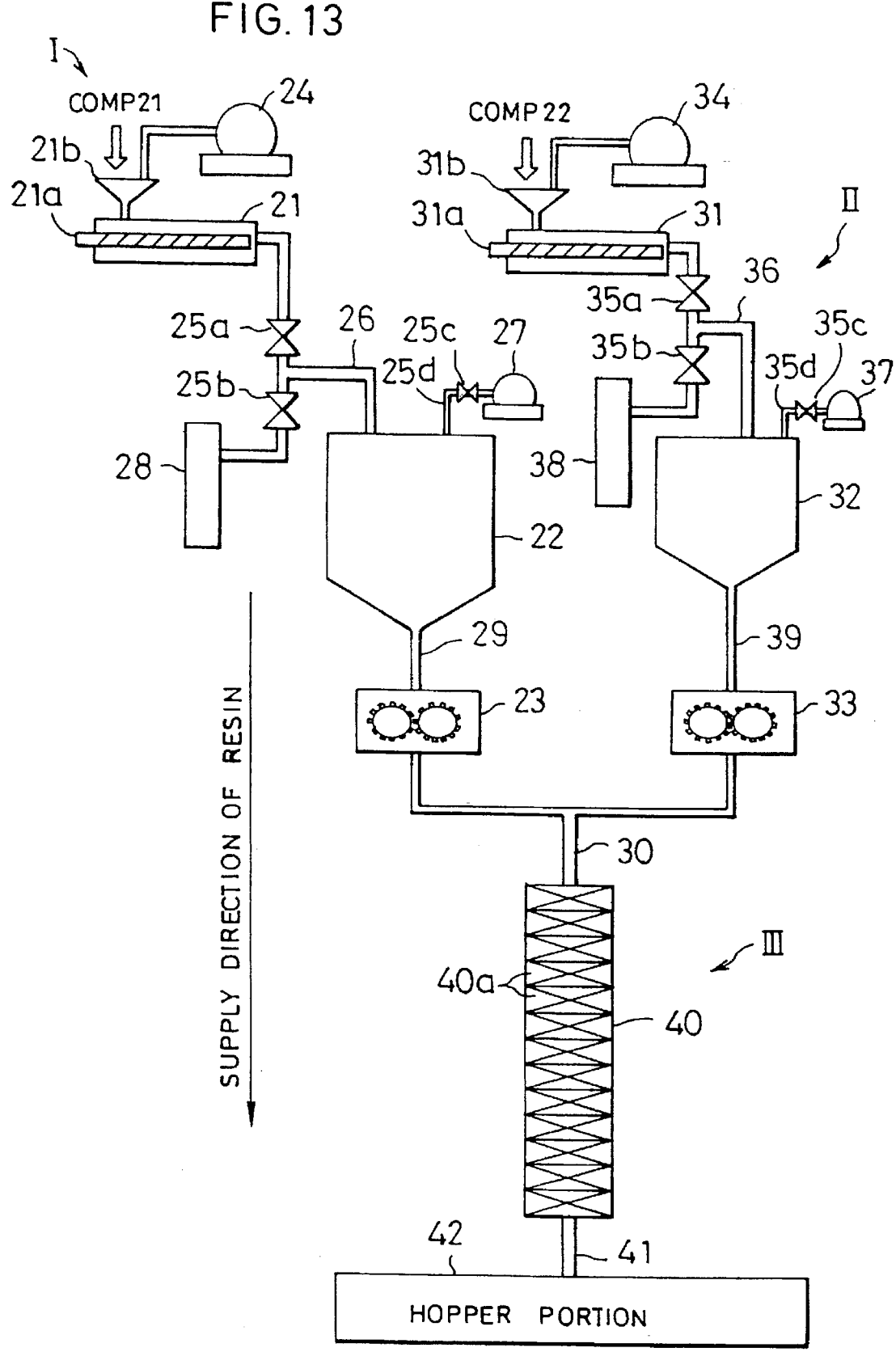
FIG. 13 is a schematic explanatory view of an aspect of mixing supply device employed in the manufacturing process according to the present invention.

In FIG. 13, there is shown another aspect according to the present invention, which consists of a system including three lines of a main composition mixing and supplying line I, a hardener mixing and supplying line II and a resin supplying line III. While in the following description the thermosetting resin is referred to as epoxy resin, other vinyl ester resin, phenol resin and unsaturated polyester resin than epoxy resin may be used alone or in combinations.

The arrangement shown in FIG. 13 is made for preparing such hot-melt type thermosetting resin as hot-melt epoxy resin, in order to prevent from occurring any void in the prepreg or any unevenness in the surface of the prepreg due to a residual solvent, and this hot-melt epoxy resin can be obtained by melt-mixing a resin COMP21 consisting of a resin composition containing more than one main epoxy resins containing substantially no solvent, with a resin COMP22 consisting of a resin composition containing more than one epoxy resin and the hardener or more than one epoxy resin, hardener and hardening promotor, containing substantially no solvent. In the resin composition constituting the resin COMP21, there may be mixed fine particles of metal oxide of alumina or silica.

The main composition mixing and supplying line I is constituted by providing in the line of mixing and supplying the resin COMP21 of the epoxy resin composition containing the above main epoxy resin a kneading extruder 21, a main component master-batch tank 22 and a metering gear pump 23. In this case, the kneading extruder 21 is provided therein with knead-extrude screw 21a and substantially the same heater as that in the foregoing Examples, and a vacuum pump 24 is mounted so as to suck the interior air for performing the melt mixing of the resin under a high vacuumed condition. While the kneading extruder 21 may be of a single shaft arrangement with one knead-extrude screw 21a or of a double shaft arrangement with two screws, the latter double shaft arrangement is preferable from a view point of the mixing properties of the resin. To this kneading extruder 21, the resin COMP21 of the foregoing epoxy resin composition is inserted through a hopper 21b, to be melt-mixed by means of the screw 21a while being deaerated under a highly vacuumed state of less than 100 Torr by means of the vacuum pump 24, and the resin is extruded out of the kneading extruder 21. An extruding side of this extruder 21 is connected through a valve 25a to the main component master-batch tank 22 by means of a branch pipe 26. The molten resin COMP21 from the extruder 21 is supplied through the branch pipe 26 to the tank 22 to be stored therein.

To this tank 22, a vacuum tank 27 is mounted through a pipe 25d having a valve 25a for storing the resin COMP21 under a high vacuumed condition, and the interior of the tank 22 is being sucked to be the high vacuum of less than 100 Torr by the vacuum pump 27. On outer side of the tank 22, the same heater as in the foregoing Examples is provided for maintaining the stored resin COMP21 in the molten state. For the purpose of flushing the branch pipe 26 and tank 22, a pressurized gas supply means 28 comprising a steel gas cylinder or a compressor is provided, and this pressurized gas supply means 28 is connected through a branch pipe 26 having a valve 25b to the tank 22.

The resin COMP21 of the epoxy resin composition stored in the tank 22 is supplied to the metering gear pump 23 through a supply pipe 29 mounted to the bottom of the tank 22, and is conveyed, as being metered to be at a predetermined rate according to rotating speed of gears, through branched supply pipe 30 mounted to the gear pump 23. At an immediately downstream position of an outlet of this gear pump 23, there may be provided a filter for the purpose of deaeration of bubbles in the resin and filtration of any foreign matter. On the outer side of the gear pump 23, supply pipe 29 and branched supply pipe 30, a heater is provided for maintaining the resin COMP21 in the molten state. The hardener mixing and supplying line II is a series for mixing and supplying the resin COMP22 of the hardener-resin composition containing epoxy resin and the hardener, or the hardener and hardening promotor, and comprises a kneading extruder 31, hardener master-batch tank 32 and metering gear pump 33.

The kneading extruder 31 is likewise sucked by a vacuum pump 34 to render the interior to be in highly vacuumed state to be less than 100 Torr, and the resin COMP22 of the resin composition containing the hardener and hardening promotor and inserted through the hopper 31b is subjected to the melt-mixing by means of the knead-extrude screw 31a, while being deaerated under the high vacuum of less than 100 Torr. The molten resin COMP22 from the extruder 31 is sent through a branch pipe 36 having a valve 35a to a hardener master-batch tank 38, and is stored in the molten state under the high vacuum. The resin COMP22 stored in the tank 32 is supplied through a supply pipe 39 to the metering gear pump 33, and is supplied through the branched supply pipe 30 as being metered to be at a predetermined rate by the gear pump 33. Similarly, the interior of the tank 32 is sucked to be less than 100 Torr by means of a vacuum pump 37 connected thereto by a pipe 35d having a valve 35c, while a heater is provided on outer side of the tank 32, and a pressurized gas supply means 38 for flushing the branch pipe 36 and tank 32 is connected to the tank 32 through the branch pipe 36 having the valve 35b. Right after the gear pump 33, a filter for the purpose of deaeration and filtration may be provided, and a heater is provided on outer side of the gear pump 33 and supply pipe 39.

The resin supplying line III is constituted by a static mixer 40 connected to lower end of the branched supply pipe 40, and a supply pipe 41 mounted to a lower end of the mixer 30, and a tip end of the supply pipe 41 is made to reach a hopper portion (resin reservoir) 42 of the coater. A heater is provided on the outer side of the mixer 40 and supply pipe 41, and also on the outer side of the resin reservoir 42 of the coater. The resin COMP21 of the epoxy resin composition and the resin COMP22 of the hardener-resin composition supplied as metered through the metering gear pumps 23 and 33 are joined as passed through the branched supply pipe 30, thereafter put into the mixer 40 to be mixed and prepared as the hot melt epoxy resin, which is then supplied sequentially through the supply pipe 41 to the hopper portion 42 of the coater and is applied by the coater to the glass cloth of the prepreg reinforcing glass fibers, to coat it.

The above static mixer 40 comprises a multilayered stack of mixer units 40a provided with stationary vanes for varying a flow of the resin in various directions to mix the resin, and the resin COMP21 and COMP22 can be mixed with each other without involving air bubble. The mixer units 40a should preferably be provided more than 12 stages, though it depends on the viscosity or supply rate of the resin. With the mixer units 40a less than 12 stages, the resin mixing is insufficient. With more than 12 stage, the resin can be sufficiently mixed, but about 50 stages will be the upper limit from the view point of the costs and pressure rise. In place of the static mixer 40, it is also possible to employ dynamic mixers represented by a planetary mixer, and the resin COMP21 and COMP22 can be likewise mixed, without involving any air bubble.

While the filter for the purpose of deaerating, filtrating and mixing of the resins may be provided immediately after the outlets of the gear pumps 23 and 33, it is also preferable to provide the filter for the purpose of the deaerating, filtrating and mixing of the resins also immediately after an outlets of the static mixer 40. The filters immediately after the outlets of the gear pumps 23 and 33 and mixer 40 may be any shape of flat plate, corrugated shape and cylindrical shape, and, for their material, a wire net filter, nonwoven cloth filter, metallic filter with metal powder sintered and, further, a filter charged with such inorganic fine particles as alumina powder or metal powder as a filtering material. They may be employed alone or in combinations.

The mesh (hole diameter) of the filter may be 5 to 500 μm, preferably be 10 to 300 μm. If the mesh is smaller than 5 μm, the hardener in powdery state in the resin is trapped by the filter, and there arises a pressure rise in the resin being supplied through the filter. When the mesh is larger than 500 μm, the effect of the deaeration, foreign-matter filtration and resin mixing cannot be sufficiently shown.

While in the operation of the present apparatus the resin COMP21 and COMP22 after being melt-mixed in the kneading extruders 21 and 31 are maintained in molten state in respective parts of the apparatus, their viscosity should preferably be of 500 to 500,000 cPS. If the viscosity of the molten resin is lower than 500 cPS, there arises a problem in the metering at the metering gear pumps 23 and 33, whereas the viscosity higher than 500,000 cPS renders the resin to be hard so that the sufficient mixing at the mixer 40 or the sufficient deaeration or mixing at the filter immediately after the outlet of the metering gear pumps 23 and 33 or of the mixer 40 cannot be realized. In order for attaining the complete deaeration or mixing, the viscosity of the respective molten resin COMP21 and COMP22 or of their mixture should preferably be 1,000 to 30,000 cPS.

Further, in operating the apparatus, the temperature at the respective parts of the apparatus from the kneading extruders 21 and 31 to the most downstream supply pipe 41 is controlled as in the followings. That is, the resin COMP21 of the main component resin composition does not involve any film forming reaction, and the kneading extruder 21, branch pipe 26, tank 22, supply pipe 29 and metering gear pump 23 are controlled to be at a temperature in a range in which the viscosity will be 1,000 to 30,000 cPS. The resin COMP22 of the hardener-containing resin composition as well as the mixture of the resin COMP21 and COMP22 involve a fear of a reaction of the hardener, the kneading extruder 31, branch pipe 36, tank 32, supply pipe 39 and metering gear pump 33 are controlled to be at a temperature lower by 20° to 80° C. than the reaction starting temperature of the resin COMP22, and the branched pipe 30, mixer 40 and supply pipe 41 are controlled at a temperature lower by 20° to 80° C. than the reaction starting temperature of the mixture of the resin COMP21 and COMP22. When the temperature at the respective parts of the apparatus is made during the operation at a temperature lower by a temperature below 20° C. than the reaction starting temperature of the resin COMP21 or of the mixture of the resin COMP21 and COMP22, an increased viscosity due to the reaction started of the resin might render the sequential operation impossible, whereas the operation at a temperature lower by a temperature exceeding 80° C. than the reaction starting temperature may render the resin to be stable without any reaction but the viscosity to rise more than 30,000 cPS, so as to render the viscosity excessively high from the initial stage and the operation to be impossible.

Further, it is preferable that the time from the discharge of the resin COMP21 and COMP22 out of the tanks 22 and 32, preferably from the discharge of the resin COMP21 and COMP22 out of the kneading extruders 21 and 31, to the supply of their hot-melt epoxy resin mixture to the hopper portion 42 of the coater (residence time) is made less than 30 minutes. For the reaction starting temperature, a reactional heat generation curve was obtained by performing measurements from 0° to 250° C. at a rate of 10° C./minute by means of DSC in respect of the resin COMP22 and the mixture of the resin COMP21 and COMP22, and an on-set temperature of the curve has been made as the reaction starting temperature.

Figure 14:
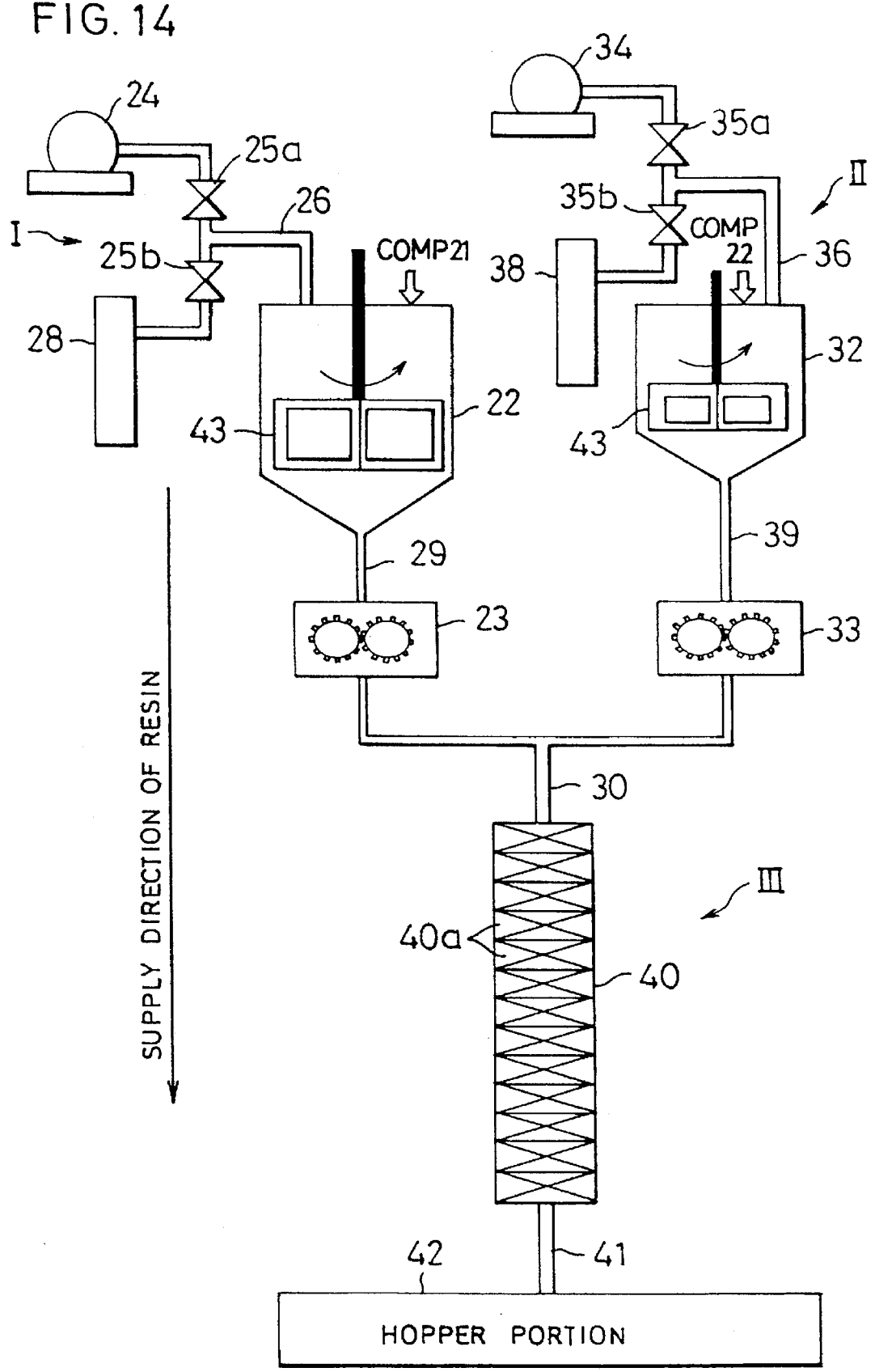
FIG. 14 is a schematic explanatory view in another aspect of the mixing supply device employed in the process according to the present invention.

While in the above apparatus the kneading extruders 21 and 31 are provided respectively at front stage of the storing tank 22 and 32, it is also possible to provide in the storing tanks 22 and 32 respectively each of mixing agitators 43 and 53 as represented by an anchor type agitator, so that the kneading extruder may be omitted by performing a vacuum mixing of the resin COMP21 and COMP22 in the respective tanks, as shown in FIG. 14. In this case, the vacuum pumps 24 and 34 are mounted directly to the branch pipes 26 and 36 respectively for the tanks 22 and 32, just through the valves 25a and 35a and the vacuum pumps 27 and 37 provided to the tanks 22 and 32 as in FIG. 13 are omitted. Other arrangement in the apparatus of FIG. 14 are basically the same as the apparatus of FIG. 13, and the same reference numbers are those in FIG. 13 denote the same members.

According to the apparatus of FIG. 14, the resin COMP21 and COMP22 are directedly inserted in the tanks 22 and 32, respectively, the resin COMP21 and COMP22 are fused by the heaters around the tanks 22 and 32 in the vacuumed state to be more than 100 Torr, and the melt-mixing of the resin COMP21 and COMP22 is respectively carried out by agitating them with the agitators 43 and 53.

With the above arrangement, the mixing and supply of the resin are realized as has been referred to, so that the resin COMP21 consisting of resin composition containing more than one epoxy resin as the main component and containing substantially no solvent (the resin COMP21 may contain metal oxide particles of alumina, silica and the like in accordance with the object) and the resin COMP22 comprising a resin composition containing more than one epoxy resin and a hardener, substantially without any solvent, or more than one epoxy resin, hardener and a hardening promotor are melt-mixed respectively in the vacuumed state of more than 100 Torr, the molten resin COMP21 and COMP22 involving no air bubble can be thereby obtained, and the hot-melt epoxy resin involving no air bubble can be prepared by mixing these resin COMP21 and COMP22 so as to melt-mix them by such mixer as the static mixer, without mixing any air bubble thereinto. Further, as the respective resin COMP21 and COMP22 are provided for the mixing as metered into the predetermined amounts by the metering gear pumps, the hot-melt epoxy resin prepared can be quantitatively stably, sequentially supplied to the hopper portion of the coater, it is made possible to coat the glass cloth with the resin involving no air bubble with the coater, and to manufacture the glass fiber reinforced epoxy resin prepreg containing no void at all and excellent in the smoothness and the thickness uniformity, whereby it will be enabled to manufacture the printed circuit substrate with such prepreg employed, and thus to obtain the printed circuit substrate remarkably reduced in the void and improved in the electric characteristics, heat-resistance and long term reliability.

EXAMPLE 21

The resin COMP21 consisting of bromine-containing epoxy resin composition and the resin COMP22 consisting of the epoxy resin composition containing dicyandiamide DICY (average particle diameter 3.0 μm) as the hardener and imidazole EMZ as the hardening promotor were placed in the kneading extruder 21 accompanying the vacuum pump 24 and in the kneading extruder 31 accompanying the vacuum pump 34 (both extruders being of double shafts) in FIG. 13 respectively, and extruded thereout after being melt-mixed at 120° C. and 60° C. respectively and at the vacuumed state of 20 Torr, and the resin COMP21 and COMP22 in molten state were supplied respectively to each of the tanks 22 and 32 kept at 60° C. Thereafter, the predetermined amount of the respective resin COMP21 and COMP22 as metered by the metering gear pumps 23 and 33 were supplied to the static mixer 40 (of 24 stages) to be statically mixed therein, and the hot melt epoxy resin was prepared thereby and supplied to the hopper portion 42 of the coater.

The supply pipes 29 and 39, branched supply pipe 30, supply pipe 41, mixer 40 and coater hopper portion 42 were all kept at 60° C., upon which the viscosities of the resin COMP21 and COMP22 were 30,000 cPS and 1,200 cPS, respectively, and the viscosity of the hot-melt epoxy resin of the mixed resin COMP21 and COMP22 was 20,000 cPS. The residence time from the tanks 22 and 32 to the hopper portion 42 was 10 minutes. The reaction starting temperatures of the resin COMP22 and the hot-melt epoxy resin of the mixed resin COMP21 and COMP22 were 100° C. and 125° C., respectively, as measured by DSC. Accordingly, the present apparatus has been operated at a temperature lower by 40° C. than the reaction starting temperature in respect of the resin COMP22 and at a temperature lower by 65° C. than the reaction starting temperature in respect of the mixture of the resin COMP21 and COMP22.

Thereafter, the glass fiber reinforced prepreg was manufactured through the manufacturing line for the prepreg, as shown in FIG. 1. This manufacturing line comprises, from the upstream side as has been referred to with reference to FIG. 3, the unwinder 1 of the glass cloth A and including the unwind roller 1' and take-over roller 1", the accumulator 2 assuring the continuous operation upon change-over of the rollers 1' and 1", the die type coater 7 having the hopper 6, the back-up roller 8 coated on the surface of the metallic roller with fluoroplastic or silicone resin, the infrared ray heater 9, the compaction rollers 15 and 15', the floating dryer 10 having the plurality of nozzles for injecting the hot gas above and below and retained at the predetermined temperature, and the reeler 12 for the glass cloth prepreg B and including the reel-up roller 12' and take-over roller 12".

The glass cloth A (a product by KANEBO of 215 g/cm² mesh) was unwound from the unwinder 1, supplied through the accumulator 2 directly to the die coater 7, and was subjected to the direct coating on the glass cloth A with the foregoing hot-melt epoxy resin at the temperature of 60° C. and the viscosity of 20,000 cPS so as to be the resin content of 156 g/m². Thereafter, the cloth was made to run for 10 seconds through the infrared ray heater 9 controlled at 150° C. to impregnate the resin in the cloth A, and was then pressurized by the compaction rollers 15 and 15' at 75° C. under the pressure of 5 kg/cm² to be smoothed. Then, the cloth A was made to run for 60 seconds through the floating dryer 10 controlled at 160° C. to have the resin semi-hardened, and the glass fiber reinforced prepreg B was manufactured. The glass cloth prepreg B was reeled on the reeler 12. As the thus obtained glass cloth prepreg was observed with an optical microscope of a magnifying power of 50 times, the surfaces of the prepreg was smooth and there was recognized no void at all.

EXAMPLE 22

In Example 21, a woven metal filter of a mesh of 100 μm was inserted immediately after the outlet ports of the metering gear pumps 23 and 33 and also right after the outlet port of the static mixer 40, for elevating the effect of foreign matter removal, deaeration and mixing properties. Except for this respect, the hot-melt epoxy resin was prepared in the same manner as in Example 21, and the glass fiber reinforced prepreg was manufactured with the above resin employed.

As a result, the mixing properties of the resin COMP21 and COMP22 were further improved, the foreign matter was completely eliminated, and the obtained prepreg was sufficiently improved in the reliability. The smoothness of the surfaces of the prepreg was excellent, similarly to Example 21, and no void could be recognized at all.

EXAMPLE 23

A planetary mixer was employed instead of the static mixer in Example 21, and the resin COMP21 and COMP22 were dynamically mixed. Except for this respect, the hot-melt epoxy resin was prepared in the same manner as in Example 21, and the glass fiber reinforced prepreg was manufactured with the prepared resin employed. As a result, the surface smoothness of the obtained prepreg was excellent similarly to Example 21, and no void could be recognized at all.

EXAMPLE 24

The apparatus was operated with the same resin COMP21 and COMP22 as those in Example 21 employed, and with the tanks 22 and 32, supply pipes 29 and 39, branched supply pipe 30, supply pipe 41, gear pumps 23 and 33, mixer 40 and coater hopper portion 42 maintained at all 75° C. This temperature of 75° C. was the operating temperature lower by 25° C. and 50° C. than the reaction starting temperatures of the resin COMP22 and of the mixture of the resin COMP21 and COMP22, respectively. The viscosity at 75° C. was made to be 12,000 cPS for the resin COMP21, 600 cPS for the resin COMP22, and 4,000 cPS for the hot-melt epoxy resin of the mixed resin COMP21 and COMP22. Further, the apparatus was operated so that the resin residence time was 5 minutes. The prepreg obtained in the same manner as in Example 21, except for the above respects, was excellent in the surface smoothness as in Example 21, and no void was recognized at all.

EXAMPLE 25

In this Example, the apparatus shown in FIG. 14 was used. The same resin COMP21 and COMP22 as in Example 21 were respectively inserted directly in the tanks 22 and 32 of FIG. 14 and respectively melt-mixed under the vacuum of 100 Torr and at a temperature of 120° C. and 60° C. in the tanks 22 and 32 and as agitated by the agitators 43 and 53. Thereafter, the resin COMP21 was lowered in the temperature to 60° C., the hot-melt epoxy resin was prepared in the same manner as in Example 21, and the glass fiber reinforced prepreg was manufactured with the above resin employed. As a result, the obtained prepreg was excellent in the surface smoothness and no void could be recognized at all, as in Example 21.

Comparative Example 11

The resin COMP21 and COMP22 were melt-mixed with the kneading extruders 21 and 31 not-vacuumed. Except for this respect, the glass fiber reinforced prepreg was manufactured in the same manner as in Example 1, as a result of which the hot-melt epoxy resin supplied to the coater hopper portion 42 involved so many bubbles that the prepreg manufactured with such resin was remarkably uneven in the surface, and the microscopic observation has revealed voids of 260 pieces/inch² of the prepreg.

Comparative Example 12

The resin COMP21 and COMP22 were melt-mixed in the kneading extruders 21 and 31 vacuumed to be 150 Torr. Except for this respect, the same manufacture was made in the same manner as in Example 21. As a result, the hot-melt epoxy resin supplied to the coater hopper portion 42 was insufficient in the deaeration, and the glass fiber reinforced prepreg manufactured with this resin employed has shown than the unevenness remained in the surface and the microscopic observation has revealed the voids of 70 pieces/inch² in the prepreg.

Comparative Example 13

The apparatus of FIG. 13 was operated by maintaining the tank 32, supply pipe 39 and metering gear pump 33 at 85° C., lower by 15° C. than the reaction starting temperature of the resin COMP22, and the branched pipe 30, mixer 40, supply pipe 41 and coater hopper portion 42 at 110° C., lower by 15° C. than the reaction starting temperature of the hot-melt epoxy resin of the mixture of the resin COMP21 and COMP22. Other respects than the above, the operation was made the same as in Example 21. In this case, the high operating temperatures have caused the reaction to occur during the resin mixing and supply, and the pipes clogged to cause the operation to be not operated in stable manner.

Comparative Example 14

The apparatus was operated by maintaining the tank 32, supply pipe 39 and metering gear pump 33 at 15° C., lower by 85° C. than the reaction starting temperature of the resin COMP22, and the branched pipe 30, mixer 40, supply pipe 41 and coater hopper portion 42 at 40° C., lower by 85° C. than the reaction starting temperature of the hot-melt epoxy resin of the mixture of the resin COMP21 and COMP22. Other respects than the above of the operation were made the same as in Example 21. In this case, the viscosities of the resin COMP22 and the mixture of the resin COMP21 and COMP22 have become high to be 700,000 cPS and 800,000 cPS, respectively, so as to render the resin supply and deaeration became difficult, the mixing properties of the resins at the static mixer 40 was remarkably deteriorated, and a hot-melt epoxy resin involving many bubbles and non-uniform only could be obtained. Obtained prepreg involved many voids (340 pieces/inch$^2$) and the semi-hardened state was varying depending on the position to be non-uniform.

Comparative Example 16

The apparatus shown in FIG. 14 was employed in the present comparative example. The resin COMP21 and COMP22 respectively inserted in the tanks 22 and 32 and melt-mixed therein, without vacuuming the tanks. Except for this respect, the operation was made the same as in Example 21. As a result, the hot-melt epoxy resin supplied to the coater hopper portion 42 involved so many bubbles that the prepreg manufactured with this resin has shown remarkable unevenness in the surface, and the microscopic observation has revealed voids of 260 pieces/inch$^2$.

Comparative Example 17

The woven metal filter was inserted immediately after the outlet ports of the metering gear pumps 23 and 33 and also immediately after the outlet port of the static mixer 40 as in Example 22, while the mesh of such filters was made to be 3 μm, in respect of the latter of which the operation was made different, and all other respects were made the same as in Example 22. As a result, the filter was caused to be clogged by the hardener, whereby the line was clogged to render the stable operation to be impossible.

Comparative Example 18

The static mixer 40 in Example 25 was modified to be of 6 stages. Except for this, the operation was the same as in Example 25. In this case, the mixing properties of the resin supplied to the coater hopper portion 42 were insufficient, and the thus manufactured prepreg was varying in the semi-hardened state depending on the position to be non-uniform.

Further, in the present invention, there is provided a process for manufacturing the prepreg with the manufacturing apparatus as has been shown in FIG. 1 but in another arrangement. More in detail, the epoxy resin comprises a compound having 2 or more epoxy groups per molecule and containing 50 weight % or more of epoxy resin in liquid state with a viscosity of 1000 to 30000 cPS at a temperature of 25° C. as in the foregoing Example. In this case, when the viscosity is less than 1000 cPS, the resultant solventless epoxy resin composition becomes too low in viscosity, disadvantageously making it difficult to obtain a prepreg having a desired resin coverage; whereas, when the viscosity exceeds 30000 cPS, the resultant solventless epoxy resin composition becomes too high in viscosity, disadvantageously making it difficult for the substrate to be uniformly impregnated with the solventless epoxy resin composition. In accordance with the present invention, when the substrate is impregnated with 50 weight % or more of the aforementioned epoxy resin in liquid state, a solventless epoxy resin composition having a suitable viscosity can be obtained during the coating operation. The epoxy resin in liquid state may be, e.g., bisphenol A type epoxy or resin bisphenol F type epoxy resin, but the present invention is not limited to the use of these examples. The epoxy resin usable with the epoxy resin in liquid state, on the other hand, may be, e.g., cresol novolak type epoxy resin or phenol novolak type epoxy resin, but the invention is not limited to the use of these examples.

For the phenolic compound having 2 or more of phenolic hydroxyl groups per molecule, for example, bisphenol A type, halide bisphenol A type, bisphenol F type, halide bisphenol F type, phenol novolak type, cresol novolak type or pyrogalol type. Since the phenolic compound having 2 or more of phenolic hydroxyl groups per molecule, the compound reacts with the above epoxy resin. For this reason, the type of the phenolic compound influences the performance of the obtained hardened material. When halide bisphenol A type or halide bisphenol F type is employed as the phenolic compound, for example, there can be obtained a hardened material with a good flame retardancy and flexibility.

Dicyandiamide used in the present invention acts as a hardener for the epoxy resin. Dicyandiamide has been conventionally used as a potential hardener. In order to exhibit the original potentiality of dicyandiamide, however, it is necessary to mix dicyandiamide under such a condition that dicyandiamide is not dissolved in the epoxy resin. This requires the mixing temperature to be lower than 110° C. and desirably than 70° C. When dicyandiamide is mixed under such conditions, dicyandiamide is almost not soluble in the epoxy resin and so on. In order to obtain the inherent potentiality of dicyandiamide, the solubility of dicyandiamide in the epoxy resin or the like is required to be 0 to 10% or, preferably, 0 to 5% (that is, dicyandiamide is in non-dissolved and dispersed state by 100 to 90% or 100 to 95%). Further, when dicyandiamide is dissolved more than 10% in the epoxy resin or the like, it is possible that the prepreg cannot be manufactured stably, due to a high reactivity of dicyandiamide and such variation with time as a viscosity increase and so on of the resin composition at a temperature exceeding 50° C. Since the epoxy resin composition thus obtained has the potentiality, the composition can be less reactive at low temperatures (below about 130° C.) and thus can have a viscosity less increased during its coating and smoothing steps, sustaining a good coating, impregnating and smoothing properties. In addition, since the epoxy resin composition has a good reactive property at temperatures of 150° C. or higher, it is possible to make the composition in the form of semi-film or to harden the composition. Also another hardener of dicyandiamide can be used together therewith. Other hardeners usable therewith include, for example, diaminomaleonitril, aromatic amine, hydrazide compound, and acid anhydride.

For the hardening promotor for use herein, a phosphorous hardening promotor, a compound expressed by the following formula (1), aliphatic third class amines, aromatic third class amines, imidazoles, diazobicyclononen can be used. When the hardening promotor contains 2 or more types of components or ingredients and contains the phosphorous hardening promotor as its essential ingredient, the phosphorous hardening promotor selectively promotes the reaction of the phenolic compound with the epoxy resin; while, the other hardening promotor ingredient used together with the phosphorous hardening promotor promotes both the reaction of the hardener such as dicyandiamide with the dicyandiamide and the reaction of the phenolic compound with the epoxy resin. For this reason, when the phosphorous hardening promotor is used together with the hardening promotor other than the phosphorous hardening promotor, the reaction of the phenolic compound with the epoxy resin is promoted. Thus when the type of the phenolic compound is selected, there can be obtained a hardened composition which is excellent in flexibility. Further, this also enables the B-staged prepreg to advantageously have a good shelf stability. Furthermore, when a compound expressed by the following formula (1) is employed as the hardening promotor, the hardening promotor at low temperatures is made potential, with the result than the solventless epoxy resin composition and the B-staged prepreg can be made preferably good in shelf stability.

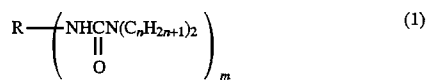

In the above formula (1), "n" denotes an integer from 1 to 4, "m" an integer 1 or 2, and "R" an organic group of a valence of "m".

Since the solventless epoxy resin composition is used which contains the epoxy resin, phenolic compound, dicyandiamide and hardening promotor as the aforementioned components, there can be obtained a composition in liquid state which has a suitable viscosity at the time of coating it though it is a solventless type. Further, a resultant hardened material manufactured with use of a prepreg obtained by coating and impregnating the composition on and into a glass substrate can has an excellent performance.

The solventless epoxy resin composition is coated on one surface of the glass substrate by means of a die coater. The "die coater" as used herein refers to a coater which has such a structure that the solventless epoxy resin composition inside the die is discharged from its lip part. When the solventless epoxy resin composition is coated on one surface of the glass substrate by such a die coater, the solventless epoxy resin composition can be coated uniformly on the substrate with a constant coverage. That is, in the die coating, a constant amount of such solventless epoxy resin composition is discharged from the lip part. Thus the die coating can produce a constant coated amount more easily than the roll coating or dip coating. Though the solventless epoxy resin composition is coated on one surface of the glass substrate, the solventless epoxy resin composition may be coated also on the other surface of the glass substrate as necessary. Usable as the glass substrates is, for example, glass cloth or nonwoven glass fabric (including glass paper).

In this case, the solventless epoxy resin composition is coated on one surface of the glass substrate and then heated to manufacture a prepreg. In this connection, the heating is not particularly limited to a specific method but may be carried out by non-contact heating, heating under pressure or the like means. The heating enables the resin to be penetrated or infiltrated up to the back face of the glass substrate and also enables the epoxy resin composition to be B-staged.

For preparing the solventless epoxy resin composition, the epoxy resin and phenolic compound are previously heated at a temperature of 100°–180° C., melted and mixed to prepare a primary mixture. In this way, since the epoxy resin and phenolic compound are melted and mixed without containing the dicyandiamide and hardening promotor, the epoxy resin can be prevented from aggressively reacting with the phenolic compound. The heating temperature when the epoxy resin and phenolic compound are melted and mixed is limited to 100°–180° C. This is because it disadvantageously takes a long time in the melting and mixing at temperatures below 100° C., while such deterioration as color variation disadvantageously takes place at temperatures exceeding 180° C.

By mixing the primary mixture, dicyandiamide and hardening promotor at a temperature of 90° C. or less in 4 hours before the solventless epoxy resin composition is coated on the glass substrate, increase in the viscosity of the epoxy resin composition is suppressed. When the viscosity of the solventless epoxy resin composition is remarkably increased, this disadvantageously results in that the infiltration of the composition into the glass substrate is deteriorated, there occurs a remarkable difference in the appearance between the face and back of a resultant prepreg, and the resin composition cannot be infiltrated uniformly. Further, when the viscosity of the solventless epoxy resin composition is as extremely high as several hundred of thousands of cPS, the coating of the solventless epoxy resin composition on one side of the glass substrate by means of the die coater disadvantageously causes the composition to be unable to discharged from the die coater due to its high viscosity. Accordingly, since the limitation of the heating temperature at the time of the mixing and thereafter to the aforementioned range suppresses the increase of viscosity of the epoxy resin composition, there can be manufactured a prepreg in which there is no remarkable difference in the appearance between the face and back of the prepreg and the resin composition is uniformly infiltrated.

At the time of mixing the primary mixture, dicyandiamide and hardening promotor; dicyandiamide and hardening promotor are both or respectively independently mixed with the epoxy resin having softening point of 90° C. or less and having 1 or more of epoxy groups per molecule or with the phenoloc compound having a softening point of 90° C. or less and having 1 or more of phenolic hydroxyl groups per molecule to prepare a preliminary mixture, and then the preliminary mixture is mixed with the primary mixture. Which is preferable since the dicyandiamide and hardening promotor can be efficiently and uniformly dispersed and dissolved into the epoxy resin composition. Further, at the time of mixing the primary mixture, dicyandiamide and hardening promotor; either one of the dicyandiamide and hardening promotor is mixed with the epoxy resin having softening point of 90° C. or less and having 1 or more of epoxy groups per molecule or with the phenolic compound having a softening point of 90° C. or less and having 1 or more of phenolic hydroxyl groups per molecule to prepare and use a preliminary mixture. This is preferable because the components of the preliminary mixture can be efficiently and uniformly dispersed and dissolved into the epoxy resin composition.

The "preliminary mixture" as used herein is known as so-called "master batch". The dicyandiamide and hardening promotor used are very small in their addition amounts when compared with the primary mixture having the epoxy resin and phenolic compound melted and mixed therein, and dicyandiamide is bad in the compatibility with the epoxy resin or phenolic compound, so that, when the master batch is prepared and mixed as mentioned above, the uniformity of the resultant epoxy resin composition can be easily realized and it can be suppressed that irregular hardening or variations in the performance take place. When the preparation of the preliminary mixture requires heating, the heating temperature is set desirably at a temperature of 90° C. or less, since the heating temperature less advances the reaction in the preliminary mixture. For the epoxy resin having softening point of 90° C. or less and having 1 or more of epoxy groups per molecule, for example, bisphenol A type epoxy resin or bisphenol F type epoxy resin is used, but the present invention is not limited thereto. Further, for the phenolic compound having a softening point of 90° C. or less and having 1 or more of phenolic hydroxyl groups per molecule, for example, phenol novolak type or cresol novolak type is used, but the present invention is not limited thereto.

Prior to the coating step, it is necessary to weigh fixed amounts for source materials, mix them and then supply the mixture to the die coater. At this time, when such means is employed that a vacuum extraction device is used to subject materials in the respective steps to vacuum subtraction, a gear pump or the like is used to weigh prescribed amounts for the materials of the steps, and a continuously-suppliable mixer is used to supply the epoxy resin composition to the die coater while melting and mixing the composition; the epoxy resin composition not having air bubbles or cells mixed therein can be desirably supplied.

Epoxy Resin E1: Misphenol A type epoxy resin having an epoxy equivalent of 190 and a viscosity of 13,000 cPS at 25° C. Manufactured by Japanese firm EKIKA SHELL EPOXY Trade name: EPICOAT 828

Epoxy Resin E2: Misphenol F type epoxy resin having an epoxy equivalent of 180 and a viscosity of 4000 cPS at 25° C. Manufactured by Japanese firm DAI-NIHON INK KOGYO Trade Name: EPICLON 830

Epoxy Resin E3: Cresol novolak type epoxy resin having an epoxy equivalent of 210 and a softening point of about 80° C. Manufactured by Japanese firm DAI-NIHON INK KOGYO Trade name: EPICLON N680

Dicyandiamide: Use reagent having a molar weight of 84 and a theoretical equivalent of active hydrogen of 21 g/eq Phenolic Compound: Tetrabromobisphenol A (use reagent)

Hardening Promotor H1: Triphenylphosphine (use reagent)

Hardening Promotor H2: Hardening promotor having a compound expressed by the following formula (2) and having a melting point of about 200° C. Manufactured by Japanese firm SUNAPRO Trade name: UCAT 3503N Hardening promotor H3: 2-ethyl 4-methyl imidazole (use reagent)

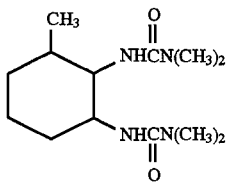
(2)

EXAMPLE 26

Epoxy resin E1 (45 weight %) and epoxy resin E3 (13 weight %) were melted and mixed at a temperature of 13° C., tetrabromobisphenol A (35 parts by weight) was added thereto, and then mixed for 20 minutes at the same temperature of 130° C. to dissolve tetrabromobisphenol A therein and to obtain a primary mixture M1. Meanwhile, 3 parts by weight of dicyandiamide and 0.06 parts by weight of hardening promotor H3 were kneaded with 7 parts by weight of epoxy resin E1 at a temperature of 400° C. by means of 3 rolls to prepare a preliminary mixture (master batch) M2 in liquid state.

The preliminary mixture M2 thus prepared was preserved at 40° C. differently for 20 minutes and 3 hours, and was then evaluated in respect of the non-solubility (degree of dispersion) of dicyandiamide, the result of which, operated by any conventional means, was 99.9% for 20 minutes and 99.7% for 3 hours.

The above primary mixture M1 was subjected to a vacuum extraction while being heated at a temperature of 70° C.; whereas the preliminary mixture M2 was subjected to a vacuum extraction while being heated at a temperature of 40° C. Then the mixtures M1 and M2 subjected to the vacuum extraction were supplied to the mixer while being metered by the respective gear pumps so as to provide the above weight ratio. With regard to the source composition ratio, dicyandiamide and hardener were set to have the above composition weight parts, with respect to 100 parts by weight corresponding to a total of all epoxy resin and tetrabromobisphenol A. In order to exhibit the original potentiality of dicyandiamide, it is necessary to mix dicyandiamide under such a condition that dicyandiamide is not dissolved in the epoxy resin. This requires the mixing temperature to be lower than 90° C. and desirably than 70° C.

Subsequently, the mixtures of M1 and M2 were mixed in the mixer while being heated at a temperature of 60° C. to prepare a solventless epoxy resin composition. The solventless epoxy resin composition was then supplied to the hopper of the die coater heated at a temperature of 60° C. After this, the solventless epoxy resin composition within the hopper was discharged from the lip part of the die coater, coated on one surface of a 0.1 mm-thick glass cloth (a product of 216L of a Japanese firm ASAHI SCHUEVER HABUSHIKI KAISHA) using, e.g., such a manufacturing line as shown in FIG. 1, heated by a preheater at a temperature of 70° C., and then heated by the floating drier at a temperature of 180° C. for 2 minutes to prepare prepregs. In this connection, by changing the residence time of the composition in the hopper, times taken for the mixtures of M1 and M2 from its start time point at the mixer to the coating were set to be 20 minutes and 3 hours to prepare two types of prepregs.

The 2 types of prepregs thus obtained had no remarkable difference in the appearance between the face and the back of the epoxy resin composition uniformly coated, impregnated infiltrated therein. The non-solubility (degree of dispersion) of the resin preserved for 20 minutes and the one for 3 hours was 99% and 97%, respectively.

The melt viscosity of the primary mixture M1 in its initial state at a temperature of 70° C. was 3000 cPS and, it was after shelf-keeping of 50 hours that the melt viscosity of the mixture when heated and kept at a temperature of 70° C. rises up to 50%. Meanwhile, the melt viscosity of the preliminary mixture M2 in its initial state at a temperature of 40° C. was 2500 cPS and, it was after shelf-keeping of 4 hours that the melt viscosity of the mixture when heated and kept at a temperature of 70° C. rises up to 50%. And the melt viscosity of the solventless epoxy resin composition of the mixtures M1 and M2 in its initial state (when mixed in the mixer for 5 minutes) at a temperature of 60° C. was 6000 cPS and, it was after shelf-keeping of 4 hours that the melt viscosity of the composition when heated and kept at a temperature of 60° C. rises up to 50%.

EXAMPLE 27

Epoxy resin E1 (7 parts by weight) was kneaded with dicyandiamide (3 parts by weight) and hardening promotor H2 (0.20 parts by weight) at a temperature of 40° C. by means of 3 rolls to prepare a preliminary mixture (master batch) M3 in liquid state. This prepreg manufacturing method was carried out using such a manufacturing line as shown in FIG. 1 in the same manner as in Example 26, except for the use of the preliminary mixture M3. The preliminary mixture M3 thus prepared was preserved at 40° C. differently for 20 minutes and 3 hours, and was then evaluated in respect of the non-solubility (degree of dispersion) of dicyandiamide, the result of which was 99.9% for 20 minutes and 99.7% for 3 hours. In this connection, by changing the residence time of the composition in the hopper as in Example 26, times taken for the mixtures of M1 and M2 from its start time point at the mixer to the coating were set to be 20 minutes and 3 hours to prepare two types of prepregs. The 2 types of prepregs thus obtained had no remarkable difference in the appearance between the face and the back of the epoxy resin composition uniformly coated, impregnated infiltrated therein. The non-solubility (degree of dispersion) of the resin preserved for 20 minutes and the one for 3 hours was 99% and 97%, respectively.

The melt viscosity of the primary mixture M3 in its initial state at a temperature of 40° C. was 2500 cPS and, it was after shelf-keeping of 50 hours that the melt viscosity of the mixture when heated and kept at a temperature of 40° C. rises up to 50%. Meanwhile, the melt viscosity of the solventless epoxy resin composition of the mixtures M1 and M3 in its initial state (when mixed in the mixer for 5 minutes) at a temperature of 60° C. was 6000 cPS and, it was after shelf-keeping of 8 hours that the melt viscosity of the mixture when heated and kept at a temperature of 60° C. rises up to 50%.

EXAMPLE 28

Epoxy resin E1 (7 parts by weight) was kneaded with dicyandiamide (3 parts by weight), hardening promotor H2 (0.10 parts by weight) and hardening promotor H2 (0.20 parts by weight) at a temperature of 40° C. by means of 3 rolls to prepare a preliminary mixture (master batch) M4 in liquid state. This prepreg manufacturing method was carried out using such a manufacturing line as shown in FIG. 1 in the same manner as in Example 26, except for the use of the preliminary mixture M4. The preliminary mixture M4 thus prepared was preserved at 40° C. differently for 20 minutes and 3 hours, and was then evaluated in respect of the non-solubility (degree of dispersion) of dicyandiamide, the result of which was 99.9% for 20 minutes and 99.7% for 3 hours. In this connection, by changing the residence time of the composition in the hopper as in Example 26, times taken for the mixtures M1 and M4 from their start time point at the mixer to the coating were set to be 20 minutes and 3 hours to prepare two types of prepregs. The non-solubility (degree of dispersion) of the resin preserved for 20 minutes and the one for 3 hours was 99% and 97%, respectively.

The 2 types of prepregs thus obtained had no remarkable difference in the appearance between the face and the back of the epoxy resin composition uniformly coated, impregnated infiltrated therein. The prepreg prepared by setting the time taken for the mixtures from the start time point to the coating to be 3 hours, was crumpled to remove resin component therefrom. The resin component was molded in dies for 90 minutes at a temperature of 170° C. to prepare a hardened resin of 4 mm×10 mm ×100 mm. The hardened resin was subjected to a bending test based on JIS standards C6481 to measure a bending modulus of elasticity. Even the hardened resings obtained in Examples 26 and 28 were subjected to similar tests to measure their bending moduli of elasticity. It has been found from the comparison with Example 28 that the bending modulus of elasticity of the hardened resin of Example 28 containing 2 or more types of hardening promotors and also containing a phosphorous hardening promotor as an essential component was smaller by about 10% than those in Examples 26 and 27.

The melt viscosity of the primary mixture M4 in its initial state at a temperature of 40° C. was 2500 cPS and, it was after shelf-keeping of 50 hours that the melt viscosity of the mixture when heated and kept at a temperature of 40° C. rises up to 50%. Meanwhile, the melt viscosity of the solventless epoxy resin composition of the mixtures M1 and M4 in its initial state (when mixed in the mixer for 5 minutes) at a temperature of 60° C. was 6000 cPS and, it was after shelf-keeping of 6 hours that the melt viscosity of the mixture when heated and kept at a temperature of 60° C. rises up to 50%.

EXAMPLE 29

Epoxy resin E2 (40 parts by weight) and epoxy resin E3 (18 parts by weight) were melted and mixed at a temperature of 130° C., tetrabromobisphenol A (35 parts by weight) was added thereto and mixed for 20 minutes at the same temperature of 130° C. to dissolve tetrabromobisphenol A therein and to obtain a primary mixture M5. This prepreg manufacturing method was carried out using such a manufacturing line as shown in FIG. 1 in the same manner as in Example 26, except for the use of the preliminary mixture M5. The preliminary mixture M2 thus prepared was preserved at 40° C. differently for 20 minutes and 3 hours, and was then evaluated in respect of the non-solubility (degree of dispersion) of dicyandiamide, the result of which was 99.9% for 20 minutes and 99.7% for 3 hours. In this connection, by changing the residence time of the composition in the hopper as in Example 26, times taken for the mixtures M1 and M4 from their start time point at the mixer to the coating were set to be 20 minutes and 3 hours to prepare two types of prepregs. The non-solubility (degree of dispersion) of the resin preserved for 20 minutes and the one for 3 hours was 99% and 97%, respectively.

The 2 types of prepregs thus obtained had no remarkable difference in the appearance between the face and the back of the epoxy resin composition uniformly coated, impregnated infiltrated therein. The melt viscosity of the primary mixture M5 in its initial state at a temperature of 40° C. was 2500 cPS and, it was after shelf-keeping of 45 hours that the melt viscosity of the mixture when heated and kept at a temperature of 70° C. rises up to 50%. Meanwhile, the melt viscosity of the solventless epoxy resin composition of the mixtures M5 and M2 in its initial state (when mixed in the mixer for 5 minutes) at a temperature of 60° C. was 6000 cPS and, it was after shelf-keeping of 4 hours that the melt viscosity of the mixture when heated and kept at a temperature of 600° C. rises up to 50%.

EXAMPLE 30

Epoxy resin E1 (33 weight %) and epoxy resin E3 (15 weight %) were melted and mixed at a temperature of 130° C., tetrabromobisphenol A (35 parts by weight) was added thereto, and then mixed for 20 minutes at the same temperature of 130° C. to dissolve tetrabromobisphenol A therein and to obtain a primary mixture M6. Meanwhile, 3 parts by weight of dicyandiamide was kneaded with 7 parts by weight of epoxy resin E1 at a temperature of 40° C. by means of 3 rolls to prepare a preliminary mixture (master batch) M7 in liquid state. Epoxy resin E1 (7 parts by weight), hardening promotor Hi (0.20 parts by weight) and hardening promotor H2 (0.20 parts by weight) were heated, mixed and dispersed to prepare a preliminary mixture (master batch) M8 in liquid state. The preliminary mixture M7 thus prepared was preserved at 40° C. differently for 20 minutes and 3 hours, and was then evaluated in respect of the non-solubility (degree of dispersion) of dicyandiamide, the result of which was 99.9% for 20 minutes and 99.7% for 3 hours.

The above primary mixture M6 was subjected to a vacuum extraction while being heated at a temperature of 70° C.; whereas the preliminary mixtures M7 and M8 were subjected to a vacuum extraction while being heated at a temperature of 40° C. Then the mixtures M6 and M7 subjected to the vacuum extraction were mixed while being metered by the respective gear pumps so as to provide the above weight ratio. Then the mixture and the preliminary mixture M8 were supplied to the mixer while being metered by the respective gear pumps so as to provide the above weight ratio. Next, the mixture of M6, M7 and M8 were mixed in the mixer at a temperature of 60° C. to prepare a solventless epoxy resin composition and then the solventless epoxy resin composition was supplied to the hopper of the die coater heated at a temperature of 60° C. After this, the solventless epoxy resin composition within the hopper was discharged from the lip part of the die coater, coated on one surface of a 0.1 mm-thick glass cloth (a product of 216L of a Japanese firm ASAHI SCHUEVER KABUSHIKI KAISYA) using such a manufacturing line as shown in FIG. 1, heated by a preheater at a temperature of 70° C., and then heated by the floating drier at a temperature of 180° C. for 2 minutes to prepare prepregs. In this connection, by changing the residence time of the composition in the hopper, times taken for the mixtures of M6, M7 and M8 from their start time point at the mixer to the coating were set to be 20 minutes and 3 hours to prepare two types of prepregs. The non-solubility (degree of dispersion) of the resin preserved for 20 minutes and the one for 3 hours was 99% and 97%, respectively.

The 2 types of prepregs thus obtained had no remarkable difference in the appearance between the face and the back of the epoxy resin composition uniformly coated, impregnated infiltrated therein.

The melt viscosity of the primary mixture M6 in its initial state at a temperature of 70° C. was 3000 cPS and, it was after shelf-keeping of 50 hours that the melt viscosity of the mixture when heated and kept at a temperature of 70° C. rises up to 50%. Meanwhile, the melt viscosity of the preliminary mixture M7 in its initial state at a temperature of 40° C. was 2300 cPS and, it was after shelf-keeping of 30 days that the melt viscosity of the mixture when heated and kept at a temperature of 40° C. rises up to 50%. Further, the melt viscosity of the preliminary mixture M8 in its initial state at a temperature of 40° C. was 1800 cPS and, it was after shelf-keeping of 120 hours that the melt viscosity of the mixture when heated and kept at a temperature of 40° C. rises up to 50%. And the melt viscosity of the solventless epoxy resin composition of the mixtures M6, M7 and M8 in its initial state (when mixed in the mixer for 5 minutes) at a temperature of 60° C. was 6000 cPS and, it was after shelf-keeping of 7 hours that the melt viscosity of the composition when heated and kept at a temperature of 60° C. rises up to 50%.

EXAMPLE 31

Epoxy resin E1 (33 weight %) and epoxy resin E3 (15 weight %) were melted and mixed at a temperature of 130° C., tetrabromobisphenol A (35 parts by weight) was added thereto, and then mixed for 20 minutes at the same temperature of 130° C. to dissolve tetrabromobisphenol A therein and to obtain a primary mixture M6. Meanwhile, 3 parts by weight of dicyandiamide was kneaded with 7 parts by weight of epoxy resin E1 at a temperature of 40° C. by means of 3 rolls to prepare a preliminary mixture (master batch) M7 in liquid state. Further, hardening promotor H3 (0.06 parts by weight) was mixed. The preliminary mixture M7 thus prepared was preserved at 40° C. differently for 20 minutes and 3 hours, and was then evaluated in respect of the non-solubility (degree of dispersion) of dicyandiamide, the result of which was 99.9% for 20 minutes and 99.7% for 3 hours.

The above primary mixture M6 was subjected to a vacuum extraction while being heated at a temperature of 70° C.; whereas the preliminary mixtures M7 and H3 were subjected to a vacuum extraction while being heated at a temperature of 50° C. Then the mixtures M6 and M7 subjected to the vacuum extraction were mixed while being metered by the respective gear pumps so as to provide the above weight ratio. Then said mixture and the hardening promotor H3 were supplied to the mixer while being metered by the respective gear pumps so as to provide the above weight ratio. Next, the mixture of M6, M7 and H3 were mixed in the mixer at a temperature of 60° C. to prepare a solventless epoxy resin composition and then the solventless epoxy resin composition was supplied to the hopper of the die coater heated at a temperature of 60° C. After this, the solventless epoxy resin composition within the hopper was discharged from the lip part of the die coater, coated on one surface of a 0.1 mm-thick glass cloth (a product of 216L of a Japanese firm ASAHI SCHUEVER KABUSHIKI KAISYA) using such a manufacturing line as shown in FIG. 1, heated by a preheater at a temperature of 70° C., and then heated by the floating drier at a temperature of 180° C. for 2 minutes to prepare prepregs. In this connection, by changing the residence time of the composition in the hopper, times taken for the mixtures of M6, M7 and H3 from their start time point at the mixer to the coating were set to be 20 minutes and 3 hours to prepare two types of prepregs. The non-solubility (degree of dispersion) of the resin preserved for 20 minutes and the one for 3 hours was 99% and 97%, respectively.

The 2 types of prepregs thus obtained had no remarkable difference in the appearance between the face and the back of the epoxy resin composition uniformly coated, impregnated infiltrated therein.

The melt viscosity of the primary mixture M6 in its initial state at a temperature of 70° C. was 3000 cPS and, it was after shelf-keeping of 50 hours that the melt viscosity of the mixture when heated and kept at a temperature of 70° C. rises up to 50%. Meanwhile, the melt viscosity of the preliminary mixture M7 in its initial state at a temperature of 40° C. was 2300 cPS and, it was after shelf-keeping of 30 days that the melt viscosity of the mixture when heated and kept at a temperature of 40° C. rises up to 50%. And the melt viscosity of the solventless epoxy resin composition of the mixtures M6, M7 and H3 in its initial state (when mixed in the mixer for 5 minutes) at a temperature of 60° C. was 6000 cPS and, it was after shelf-keeping of 7 hours that the melt viscosity of the composition when heated and kept at a temperature of 60° C. rises up to 50%.

Comparative Example 19

Epoxy resin E1 (52 parts by weight) and epoxy resin E3 (13 parts by weight were melted and mixed at a temperature of 130° C., tetrabromobisphenol A (35 parts by weight), dicyandiamide (3 parts by weight) and hardening promotor H3 (0.06 parts by weight) were added to the above melted mixture, and then mixed for 15 minutes at the same temperature of 130° C. to prepare a solventless epoxy resin composition. Next, the solventless epoxy resin composition was supplied to the hopper of the die coater heated at a temperature of 60° C. The solventless epoxy resin composition was discharged from the lip part of the die coater so that the time of the solventless epoxy resin composition taken from its start time point of the mixing to the coating was set to be 20 minutes (including 15 minutes at a temperature of 130° C. in the aforementioned case). And when the solventless epoxy resin composition within the hopper was tried to be coated on one surface of a 0.1 mm-thick glass cloth (a product of 216L of a Japanese firm ASAHI SCHUEVER KABUSHIKI KAISYA) using such a manufacturing line as shown in FIG. 1, the viscosity of the composition was too high to be able to be discharged from the lip part and to be able to be coated.

At this time, the above solventless epoxy resin composition obtained by mixing for 15 minutes at a temperature of 130° C. was supplied to the hopper of the die coater heated at a temperature of 90° C. providing a coatable viscosity. Then the solventless epoxy resin composition within the hopper was discharged from the lip part of the die coaterso that the time of the solventless epoxy resin composition taken from its start time point of the mixing to the coating was set to be 20 minutes, coated on one surface of a 0.1 mm-thick glass cloth (a product of 216L of a Japanese firm ASAHI SCHUEVER KABUSHIKI KAISYA) using such a manufacturing line as shown in FIG. 1, heated by a preheater at a temperature of 70° C., and then heated for 2 minutes at a temperature of 180° C. by means of a floating drier to prepare prepregs.

The prepregs thus prepared were insufficient in the penetration of the coated epoxy resin composition. That is, the epoxy resin composition was not infiltrated up to the back side of the coating surface and thus there is clearly a remarkable difference in the appearance of the prepreg between the face and the back. The melt viscosity of the solventless epoxy resin composition obtained by mixing for 15 minutes at a temperature of 130° C. was 500000 cPS, and the melt viscosity at a temperature of 90° C. was 10000 cPS. Further, it was after shelf-keeping of 1 hour that the melt viscosity of the composition when heated and kept at a temperature of 60° C. rises up to 50%; whereas, it was after shelf-keeping of 30 minutes that the melt viscosity of the composition when heated and kept at a temperature of 90° C. rises up to 50%.

Comparative Example 20

Epoxy resin E2 (47 parts by weight) and epoxy resin E3 (18 parts by weight) were melted and mixed at a temperature of 130° C., tetrabromobisphenol A (35 parts by weight), dicyandiamide (3 parts by weight) and hardening promotor H3 (0.06 parts by weight) were added to the above melted mixture, and then mixed for 15 minutes at the temperature of 130° C. to prepare a solventless epoxy resin composition. The non-solubility of dicyandiamide of this resin composition just after its preparation was 72%. Next, the solventless epoxy resin composition was supplied to the hopper of the die coater heated at a temperature of 600° C. The solventless epoxy resin composition was discharged from the lip part of the die coater so that the time of the solventless epoxy resin composition taken from its start time point of the mixing to the coating was set to be 20 minutes. And when the solventless epoxy resin composition within the hopper was tried to be coated on one surface of a 0.1 mm-thick glass cloth (a product of 216L of Japanese firm ASAHI SCHUEVER KABUSHIKI KAISHA) using such a manufacturing line as shown in FIG. 1, the viscosity of the composition was too high to be able to be discharged from the lip part and to be able to be coated.

At this time, the above solventless epoxy resin composition obtained by mixing for 15 minutes at a temperature of 130° C. was supplied to the hopper of the die coater heated at a temperature of 80° C. providing a coatable viscosity. Then the solventless epoxy resin composition within the hopper was discharged from the lip part of the die coater so that the time of the solventless epoxy resin composition taken from its start time point of the mixing to the coating was set to be 20 minutes, coated on one surface of a 0.1 mm-thick glass cloth (a product of 216L of Japanese firm ASAHI SCHUEVER KABUSHIKI KAISHA) using such a manufacturing line as shown in FIG. 1, heated by a preheater at a temperature of 70° C., and then heated for 2 minutes at a temperature of 180° C. by means of a floating drier to prepare prepregs.

The prepregs thus prepared were insufficient in the penetration of the coated epoxy resin composition. That is, the epoxy resin composition was not infiltrated up to the back side of the coating surface and thus there is clearly a remarkable difference in the appearance of the prepreg between the face and the back. The melt viscosity of the solventless epoxy resin composition obtained by mixing for 15 minutes at a temperature of 130° C. was 400000 cPS at a temperature of 60° C., and the melt viscosity at a temperature of 80° C. was 8000 cPS. Further, it was after shelf-keeping of 1 hour that the melt viscosity of the composition when heated and kept at a temperature of 60° C. rises up to 50%; whereas, it was after shelf-keeping of 25 minutes that the melt viscosity of the composition when heated and kept at a temperature of 80° C. rises up to 50%.

Comparative Example 21

Epoxy resin E2 (47 parts by weight) and epoxy resin E3 (18 parts by weight) were melted and mixed at a temperature of 130° C., tetrabromobisphenol A (35 parts by weight), dicyandiamide (3 parts by weight) and hardening promotor H2 (0.20 parts by weight) were added to the above melted mixture, and then mixed for 15 minutes at the temperature of 130° C. to prepare a solventless epoxy resin composition. The non-solubility of dicyandiamide of this resin composition just after its preparation was 81%. Next, the solventless epoxy resin composition was supplied to the hopper of the die coater heated at a temperature of 60° C. The solventless epoxy resin composition within the hopper was discharged from the lip part of the die coater so that the time of the solventless epoxy resin composition taken from its start time point of the mixing to the coating was set to be 20 minutes. And when the solventless epoxy resin composition was tried to be coated on one surface of a 0.1 mm-thick glass cloth (a product of 216L of Japanese firm ASAHI SCHUEVER KABUSHIKI KAISHA) using such a manufacturing line as shown in FIG. 1, the viscosity of the composition was too high to be able to be discharged from the lip part and to be able to be coated.

At this time, the above solventless epoxy resin composition obtained by mixing for 15 minutes at a temperature of 130° C. was supplied to the hopper of the die coater heated at a temperature of 85° C. providing a coatable viscosity. Then the solventless epoxy resin composition within the hopper was discharged from the lip part of the die coater so that the time of the solventless epoxy resin composition taken from its start time point of the mixing to the coating was set to be 20 minutes, coated on one surface of a 0.1 mm-thick glass cloth (a product of 216L of Japanese firm ASAHI SCHUEVER KABUSHIKI KAISHA) using such a manufacturing line as shown in FIG. 1, heated by a preheater at a temperature of 70° C., and then heated for 2 minutes at a temperature of 180° C. by means of a floating drier to prepare prepregs.

The prepregs thus prepared were insufficient in the penetration of the coated epoxy resin composition. That is, the epoxy resin composition was not infiltrated up to the back side of the coating surface and thus there is clearly a remarkable difference in the appearance of the prepreg between the face and the back. The melt viscosity of the solventless epoxy resin composition obtained by mixing for 15 minutes at a temperature of 130° C. was 300000 cPS at a temperature of 60° C., and the melt viscosity at a temperature of 85° C. was 10000 cPS. Further, it was after shelf-keeping of 1.5 hours that the melt viscosity of the composition when heated and kept at a temperature of 60° C. rises up to 50%; whereas, it was after shelf-keeping of 45 minutes that the melt viscosity of the composition when heated and kept at a temperature of 85° C. rises up to 50%.

Comparative Example 22

Prepregs were prepared in the similar manner as in Example 26, except that the time of the mixtures of M1 and M2 taken from their start time point of the mixing in the mixer to the coating was set to be 4.5 hours.

The prepregs thus prepared were insufficient in the penetration of the coated epoxy resin composition. That is, the epoxy resin composition was not infiltrated up to the back side of the coating surface and thus there is clearly a remarkable difference in the appearance of the prepreg between the face and the back. Further, since the viscosity of the solventless epoxy resin composition within the hopper is increased, the discharged amount is not made constant, thus resulting in the highly irregular resin amounts of the prepregs. The melt viscosity of the solventless epoxy resin composition of the mixtures of M1 and M2 in its initial state (when mixed in the mixer for 5 minutes) at a temperature of 60° C. was 6000 cPS, and the melt viscosity when heated and shelf-kept at a temperature of 60° C. for 4.5 hours was 11000 cPS. The non-solubility of dicyandiamide of this resin composition at the coating was 96%.

Comparative Example 23

Prepregs were prepared in the same manner as in Example 23, except that the mixtures M1 and M2 were mixed in the mixer for 5 minutes while being heated at a temperature of 60° C. to prepare a solventless epoxy resin composition, the solventless epoxy resin composition was supplied to the hopper of the die coater heated at a temperature of 105° C., the residence time of the composition in the hopper was adjusted so that the time of the mixtures M1 and M2 taken from the start time point of the mixing in the mixer to the coating was set to be 2.5 hours.

The prepregs thus prepared were insufficient in the penetration of the coated epoxy resin composition. That is, the epoxy resin composition was not infiltrated up to the back side of the coating surface and thus there is clearly a remarkable difference in the appearance of the prepreg between the face and the back. The melt viscosity of the solventless epoxy resin composition of the mixtures M1 and M2 in its initial state (when mixed in the mixer for 5 minutes) at a temperature of 60° C. was 6000 cPS, and the melt viscosity at a temperature of 105° C. was 200 cPS, the melt viscosity at a temperature of 60° C. when coated (the time of the mixtures E1 and M1 taken from the start time point of the mixing to the coating being 2.5 hours) was 25000 cPS, and the melt viscosity at a temperature of 105° C. was 10000 cPS.

As has been explained in the foregoing, in Comparative Example 23, even when the time taked to the coating was 5 hours, the increased viscosity resulted in that the resultant prepreg is insufficient in the penetration of the epoxy resin composition.

What is claimed is:

1. A process for continuously manufacturing a prepreg for use as an electrically insulating material consisting of a composite material of a fibrous sheet-shaped reinforcing substrate impregnated with a thermosetting resin, the process comprising the steps of coating uniformly one surface of a fibrous sheet-shaped reinforcing substrate with a matrix thermosetting resin substantially containing no solvent and in molten state by means of a die coater, heating the fibrous sheet-shaped reinforcing substrate coated with the matrix thermosetting resin by means of a non-contact type heating unit to semi-harden the matrix resin, and at least one of the steps of cutting a composite sheet material of the sheet-shaped reinforcing substrate with the semi-hardened matrix resin into pieces of a fixed length, and of reeling the composite sheet material without the cutting, the respective steps being made continuous.

2. The process according to claim 1 which further comprises a step of pressurizing the sheet-shaped reinforcing substrate consisting of the matrix resin and fibers by means of a plurality of rolls of a controlled temperature to smooth the matrix resin, at least at one of sequences of between the coating step and the semi-hardening step, during the semi-hardening step, and after the semi-hardening step, said pressurizing step being made continuous to said other steps.

3. The process according to claim 1 wherein said resins, and a further resin composition containing at least a hardener, the respective compositions being metered and then uniformly mixed while being maintained in the molten state, and the matrix resin being supplied to said die coater.

4. The process according to claim 3 wherein said resin composition containing epoxy resin as the main component and said further resin composition containing the hardener are respectively melt-mixed in vacuumed state to be less than 100 Torr for vacuum deaeration.

5. The process according to claim 3 wherein said resin composition containing epoxy resin as the main component and said further resin composition containing the hardener are respectively stored in vacuumed state to be less than 100 Torr for vacuum deaeration.

6. The process according to claim 3 wherein said resin composition containing epoxy resin as the main component is a mixture of epoxy resin containing more than 50% of a liquid state epoxy resin having more than two epoxy groups in each molecule and of a viscosity at 25° C. to be 1,000 to 30,000 cPS, and of a phenolic compound having more than two phenolic hydroxyl groups in each molecule; and said resin composition containing at least the hardener is a mixture of dicyandiamide, a hardening promotor, and one of epoxy resin of a softening point of less than 90° C. and a phenolic compound having more than one phenolic hydroxyl group in each molecule.

7. The process according to claim 6 wherein dicyandiamide contained in the resin composition including the hardener is in a state of being dispersed in one of epoxy resin and phenolic compound in more than 90 weight % without being fused, the resin composition containing epoxy resin as the main component and the resin composition containing the hardener and hardening promotor are uniformly mixed to be the matrix resin after being respectively metered and mixed, and the matrix resin upon being supplied to the coater and coated on the substrate also contains dicyandiamide in the dispersed state in more than 90 weight % without being fused.

8. The process according to claim 1 wherein said matrix resin comprises a resin composition of a main component of epoxy resin consisting of at least more than one components, a resin composition containing at least a hardener, and a hardening promotor, respective said compositions being metered and then uniformly mixed while being maintained in the molten state, and the matrix resin being supplied to said die coater.

9. The process according to claim 8 wherein said resin composition containing epoxy resin as the main component and said epoxy resin composition containing the hardener and a hardening promotor are respectively melt-mixed in vacuumed state to be less than 100 Torr for vacuum deaeration.

10. The process according to claim 8 wherein said resin composition containing epoxy resin as the main component and said epoxy resin composition containing the hardener and a hardening promotor are respectively stored in vacuumed state to be less than 100 Torr for vacuum deaeration.

11. The process according to claim 8 wherein said resin composition containing epoxy resin as the main component is a mixture of epoxy resin containing more than 50% of a liquid state epoxy resin having more than two epoxy groups in each molecule and of a viscosity at 25° C. to be 1,000 to 30,000 cPS, and of a phenolic compound having more than two phenolic hydroxyl groups in each molecule; and said resin composition containing at least the hardener is a mixture of dicyandiamide, a hardening promotor, and one of epoxy resin of a softening point of less than 90° C. and a phenolic compound having more than one phenolic hydroxyl group in each molecule.

12. The process according to claim 11 wherein dicyandiamide contained in the resin composition including the hardener is in a state of being dispersed in epoxy resin in more than 90 weight % without being fused; the resin composition containing epoxy resin as the main component, the resin composition containing the hardener, and the hardening promotor are uniformly mixed to be the matrix resin after being respectively metered and mixed; and the matrix resin upon being supplied to the coater and coated on the substrate also contains dicyandiamide in the dispersed state in more than 90 weight % without being fused.

13. The process according to claim 1 which further comprises a step of further coating the other surface of the sheet-shaped reinforcing substrate with said matrix resin on opposite side to said one surface coated with the matrix resin, said further coating step being included at least at one of sequences of between said coating step and said semi-hardening step and during said semi-hardening step, said further coating step being made continuous to said other steps.

14. The process according to claim 1 which further comprises a step of further coating the sheet-shaped reinforcing substrate, from the other side of the substrate opposite to said one surface, with said matrix resin subsequent to an infiltration of the matrix resin coated on said one surface of the substrate in said coating step over to the other opposite surface, said further coating step being included at least at one of sequences of between said coating step and said semi-hardening step and during said semi-hardening step, and said further coating step being made continuous to said other steps.

* * * * *